(12) United States Patent
van Druten et al.

(10) Patent No.: US 6,488,605 B2
(45) Date of Patent: Dec. 3, 2002

(54) TRANSMISSION SYSTEM, ESPECIALLY FOR A MOTOR VEHICLE

(75) Inventors: Roëll M. van Druten, Schijndel (NL); Marc A. Mussaeus, Eindhoven (NL); Bas G. Vroemen, Eindhoven (NL); Alexander F. A. Serrarens, Eindhoven (NL); Pieter A. Veenhuizen, Goirle (NL)

(73) Assignee: Van Doorne's Transmissie B.V. (NL)

( * ) Notice: Subject to any disclaimer, the term of this patent is extended or adjusted under 35 U.S.C. 154(b) by 0 days.

(21) Appl. No.: 10/003,551

(22) Filed: Oct. 24, 2001

(65) Prior Publication Data

US 2002/0055407 A1 May 9, 2002

Related U.S. Application Data

(63) Continuation of application No. PCT/EP99/02843, filed on Apr. 24, 1999.

(51) Int. Cl.[7] .............................................. F16H 37/02
(52) U.S. Cl. ...................... 475/207; 475/210; 475/218; 477/44; 477/69
(58) Field of Search ................................. 475/207, 210, 475/212, 218, 214; 477/44, 69

(56) References Cited

U.S. PATENT DOCUMENTS 3,870,116 A    3/1975  Seliber
4,495,836 A  * 1/1985  Cohen .......................... 74/751
4,525,661 A    6/1985  Mucsy et al.
4,950,208 A  * 8/1990  Tomlinson .................... 474/71
5,445,580 A  * 8/1995  Garcia ......................... 477/211

FOREIGN PATENT DOCUMENTS

| DE | 197 03 908 A1 | 8/1998 |
| EP | 0 043 909 A1 | 1/1982 |
| EP | 0 127 986 A2 | 12/1984 |
| GB | 1 374 258 | 11/1974 |
| WO | WO 96/35063 A1 | 11/1996 |

* cited by examiner

Primary Examiner—Sherry Estremsky
Assistant Examiner—Tisha D. Lewis
(74) Attorney, Agent, or Firm—Todd Deveau; Ryan A. Schneider; Troutman Sanders LLP

(57) ABSTRACT

The present invention relates to a transmission system, especially for use in a motorized vehicle. More particularly, the present invention discloses the use of a flywheel for assisting an engine in speeding up when acceleration is requested. The flywheel (135) is coupled to an epicyclic gearing (G) having three rotational members (41, 42, 43); this epicyclic gearing (G) is further coupled to a load (L) and to an engine (E), in parallel to a transmission unit (MT; CVT).

20 Claims, 12 Drawing Sheets

TRANSMISSION SYSTEM, ESPECIALLY FOR A MOTOR VEHICLE

This is a continuation of PCT/EP99/02843, filed Apr. 24, 1999.

FIELD OF THE INVENTION

The present invention relates in general to a transmission system for transmitting drive power from a drive energy source to a driven load. The invention relates particularly to a transmission system for use in a motor vehicle, where the drive energy source is the engine of the vehicle and where the driven load can be considered as being the vehicle itself or its wheels. In the following, the invention will be explained for the particular application of a transmission system in a motor vehicle, but it is explicitly noted that the invention is not restricted to such application. For instance, it is possible that the driven load is a combustion engine, an electrical motor, a generator, a gas turbine, etc.

BACKGROUND OF THE INVENTION

In motorised vehicles, it is common practice to transfer the energy from the drive energy source such as a combustion engine to the wheels through the intermediary of a transmission system. One of the purposes of the transmission system is to allow the output shaft of the engine and the wheels to rotate with mutually different rotational speeds. The ratio of the rotational speed of an input member of the transmission system to the rotational speed of an output member of the transmission system, indicated as transmission factor, can be changed manually or automatically, depending on the type of transmission system, and in particular the transmission factor may be continuously variable.

In automotive engineering, it is an ongoing objective to reduce energy consumption when the vehicle is in use. One way of achieving this objective is to minimise the size of the drive energy source. This reduces the amount of weight to be moved and provides an optimal use of the driver energy source and, if the drive energy source is an internal combustion engine, it usually provides better energy conversion efficiency. However, a disadvantage of smaller drive energy sources, especially smaller combustion engines, is that such drive energy source is only capable of providing adequate drive power at relatively high revolutions per minute. As a consequence, relatively small drive power sources have a bad load response, i.e. an unfavourable acceleration delay, because it is necessary to speed up the engine from a momentary engine speed to a higher engine speed in order to be able to deliver the required amount of drive power.

SUMMARY OF THE INVENTION

Therefore, it is an object of the present invention to provide a mechanical transmission system which is capable of assisting the engine in speeding up when acceleration is required.

In practice, a transmission system which is intended to assist the engine in speeding up is already commercially available from Honda; it is the so-called Integrated Motor Assist System. This known transmission system comprises a specific electrical motor coupled in series with a continuously variable transmission between a drive unit comprised of a combustion engine and a driven load comprised of the wheels of the vehicle, while further this known transmission system comprises a specific electrical accumulator. When acceleration is required, the relatively small combustion engine would give insufficient acceleration response by itself, but is assisted by the electrical motor which receives its energy from the electrical accumulator or battery. This battery is fed by the engine during less requiring operating conditions (and/or by absorbing breaking energy). Thus, when acceleration is required, the wheels are driven from two sources: the one source being the combustion engine, the other source being the electrical motor powered by the electrical accumulator. Thanks to the presence of the electrical motor and the electrical accumulator, the internal combustion engine can be chosen to be one with relatively low maximum engine torque, i.e. usually a relatively small engine. However, disadvantages of this known construction relate to the use of electrical energy, the necessity of converting kinetic energy to electrical energy vice versa, and the weight and costs of the electrical installation.

Therefore, it is a further object of the present invention to solve said disadvantages. More particularly, it is an object of the invention to provide a transmission system enabling the use of energy saving and relatively light drive energy sources (engines) while maintaining the advantage of using conventional, i.e. mechanical, technology, while further keeping the costs and weight of the transmission system relatively low.

According to an important feature of the present invention, the transmission system comprises an epicyclic gearing with three rotational members, wherein a first rotational member is coupled to an input of the transmission system, wherein a second rotational member is coupled to an output of the transmission system, and wherein a third rotational member is provided with a flywheel function, i.e. it is constructed as a flywheel or operatively connected with a flywheel. The epicyclic gearing may be of any type known per se, but preferably the epicyclic gearing comprises a planetary stage. Further the transmission system comprises a main transmission coupled between said input and said output of the transmission system, resulting in a desired ratio between the first and second rotational members of the epicyclic gearing being defined. In such transmission system according to the invention, under normal drive conditions the flywheel will absorb kinetic energy, while further the kinetic energy of the flywheel will be released towards either or both of the input and output of the transmission system during acceleration, thereby assisting the drive energy source. The construction is favourable in that it uses conventional technology with readily available components in a relative simple configuration. Further, the advantages of the invention can be achieved with a relatively low weight of the flywheel to be used. Further, the construction of the invention can be used in combination with any of the known types of transmission.

It is noted that it is known per se to use a flywheel in a drive line. In configurations where such flywheel is mounted directly of an input shaft of the transmission system, such configuration cannot be used to assist an engine in raising its rotational speed, since the flywheel is only capable of delivering energy while slowing down. In configurations where such flywheel is used to store kinetic energy when the vehicle is slowing down and to supply driving force to the vehicle when the vehicle is accelerating, it is necessary to equip the flywheel with a controlled coupling/uncoupling device, which is provided with actuation elements, which require actuation energy, etc, such that the construction is rather complicated. Further, when a flywheel is intended for supplying driving force to a vehicle, the flywheel must be relatively large and heavy, and must be operated at relatively high rotational speeds, however, the flywheel is used as a buffer of kinetic energy for the vehicle, i.e. when the vehicle is slowing down, kinetic energy of the vehicle is used to speed up the flywheel, while it is intended to accelerate the vehicle, rotational energy from the flywheel is transferred to the vehicle, causing the flywheel to slow down.

Further, it is noted that the use of epicyclic gearing in general, and the use of planetary stages in particular, in transmission systems is known per se. However, the purpose of such use differs from the purpose of the present invention in that normally the epicyclic gearing is applied as a fixed transmission ratio for improvement of the efficiency of a continuously variable transmission used in combination with the gearing or to change the ratio coverage of a transmission used in combination with the gearing. For instance, in the construction disclosed in WO96/35063, a planetary stage is operatively provided between an engine and a load, and a continuously variable transmission is arranged between the pinion carrier of the planetary stage and either the sun gear or the ring gear.

Further, it is also known per se in the art to use epicyclic gearings for increasing the overall transmission efficiency while reducing the ratio coverage or, vice versa, to increase ratio coverage to the detriment of the overall transmission efficiency.

BRIEF DESCRIPTION OF THE DRAWINGS

These and other aspects, features and advantages of the invention will be explained in more detail in the following description of a preferred example with references to the drawings, in which equal reference signs designate equal or similar parts, and in which.

DETAILED DESCRIPTION OF THE DRAWINGS

Figure 1A:
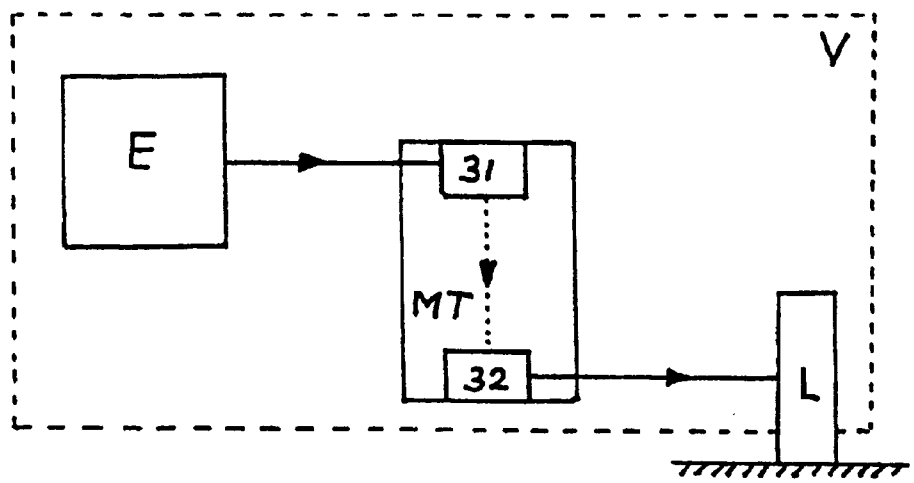
FIG. 1A illustrates diagrammatically the main components of a conventional drive line of a vehicle.

FIG. 1A diagrammatically illustrates the main components of a conventional drive line of a vehicle V. These main components comprise a drive energy source E, usually a combustion engine, and a load L to be driven, represented as a wheel of the vehicle V, the load L being coupled to the drive energy source by a main transmission MT. In the following, the drive energy source E will simply be indicated as "engine" while the load L will simply be indicated as "wheels", in view of the fact that the present invention relates especially to a transmission system for a motor vehicle, although the present invention is not limited to such use.

The main transmission MT can be of any type, such as for instance a manually operated gearbox or an automatically controlled transmission. In a particularly advantageous embodiment, the main transmission is a continuously variable transmission (CVT) of the push belt type. In all of these types of main transmission, the main transmission has a primary rotational member 31 coupled to an output shaft of the engine E, and a secondary rotational member 32 coupled to the wheels L. Under normal driving conditions, the engine E drives the primary rotational member 31, while the secondary rotational member 32 drives the wheels L, as indicated by the arrows in FIG. 1A. For this reason, the primary rotational member 31 and the secondary rotational member 32 will also be indicated as input member 31 and output member 32, respectively. However, it is to be kept in mind that a vehicle can also be slowing down; then, the engine E may act as an inertia which is driven by the wheels L and is therefore slowing down the wheels L; in such circumstances, kinetic energy flows in the opposite direction, i.e. from the wheels L to the secondary rotational member 32 to the primary rotational member 31 to the engine E. In other words, under such circumstances the secondary rotational member 32 of the main transmission MT acts as an energy input while the primary rotational member 31 of the main transmission MT acts as an energy output. Thus, in general, the engine E and the wheels L (or vehicle V) can be considered as being inertia components exchanging kinetic energy through the main transmission MT in either direction.

Figure 1B:
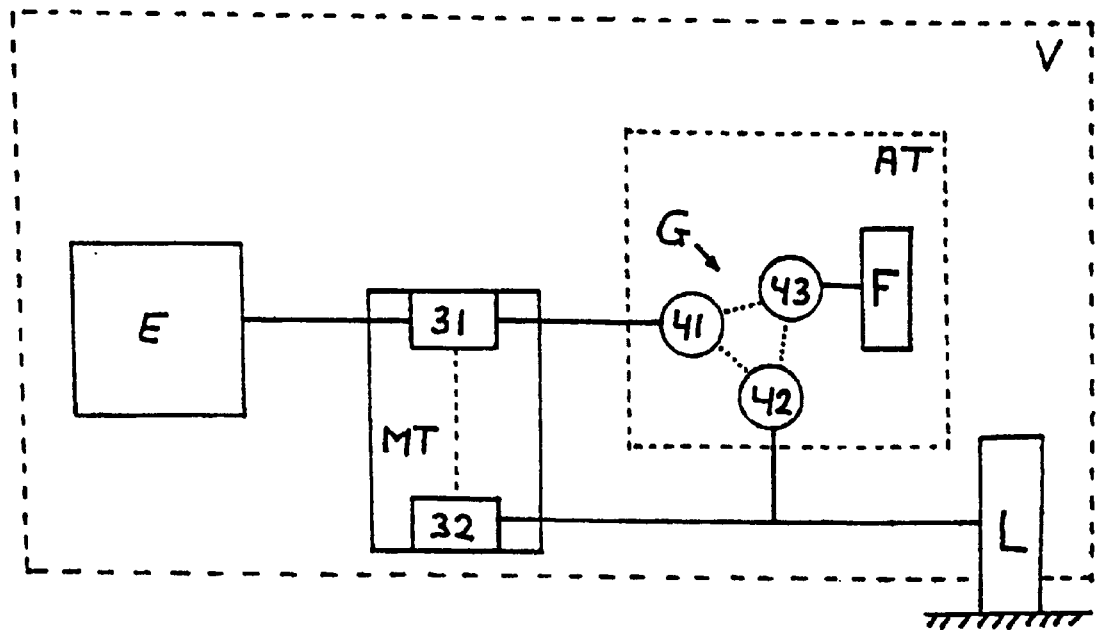
FIG. 1B illustrates diagrammatically the main components of a drive line according to the invention.
Figure 2:
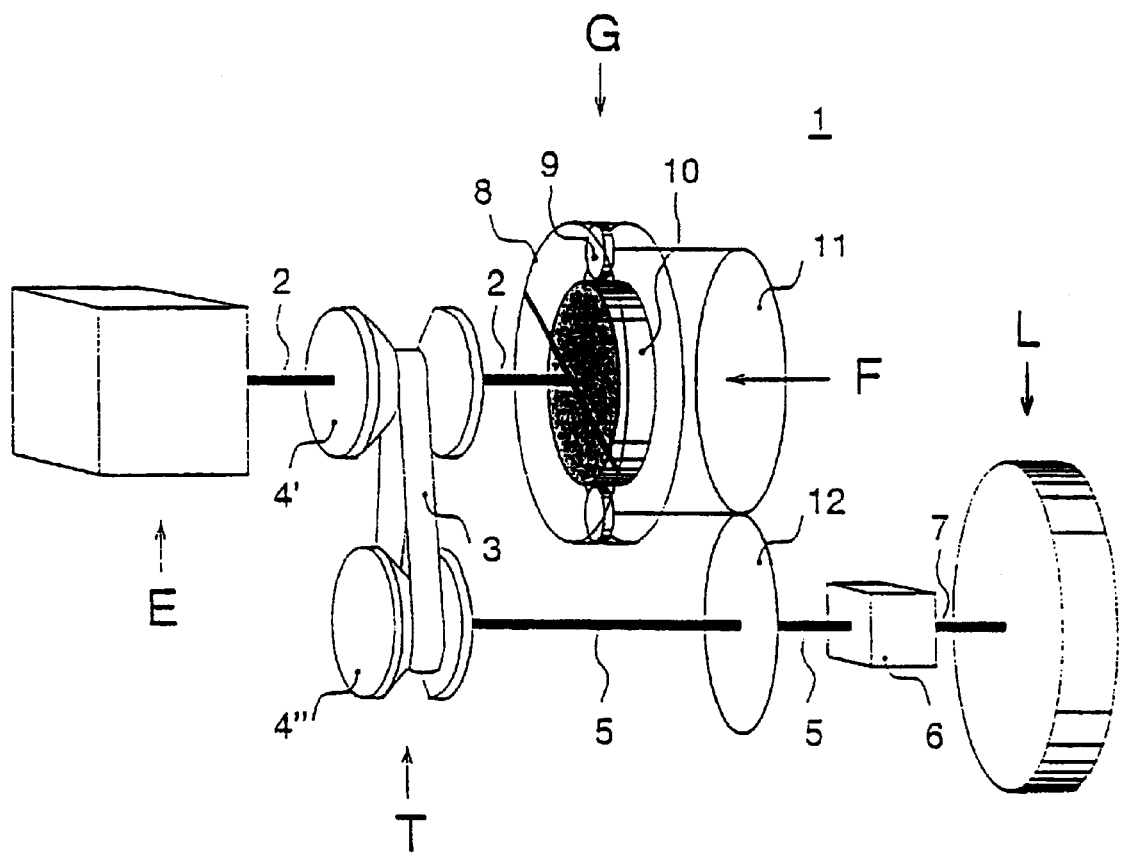
FIG. 2 is a perspective view illustrating diagrammatically the layout of a drive line according to the invention.

FIG. 1B illustrates the basic principle of the present invention. To the main transmission MT, an auxiliary transmission AT is added, coupled in parallel to the main transmission MT, The auxiliary transmission comprises an epicyclic gearing G and a flywheel F. The epicyclic gearing G comprises a primary rotational member 41 coupled to the primary rotational member 31 of the main transmission MT, a secondary rotational member 42 coupled to the secondary rotational member 32 of the main transmission MT, and a third rotational member 43 coupled through a flywheel F. FIG. 2 is a schematically perspective view of the possible lay-out of an embodiment of a transmission system 1 according to the invention. In this embodiment, the main transmission MT is depicted as a continuously variable transmission (CVT) of the push belt type comprising a first pulley 4' and a second pulley 4", coupled with each other by a metal push belt 3. Since a CVT is known per se, and the construction of the CVT does not form part of the present invention, the CVT is not discussed elaborately here. Suffice it to say that the pulleys 4' and 4" each comprise a set of conical sheaves between which the belt 3 is clamped. The two conical sheaves of each pulley are movable with respect to each other, wherein movement of the sheaves of one pulley is associated with movement of the sheaves of the other pulley in the opposite direction. These movement actuating means are controlled by control means, on the basis of inter alia the position of the drive pedal of the motor vehicle. The transmission ratio of the CVT may be varied continuously by moving the sheaves towards each other or away from another under the influence of suitable movement actuating means. The first pulley 4' of the CVT, which acts as the primary rotational member 31 of the main transmission MT, is mounted on the output shaft 2 of the engine E. The second pulley 4", which acts as the secondary rotational member of the main transmission MT, is mounted on an output shaft 5 of the main transmission MT, which is operatively connected to the load L, in the illustrated example through an optional final reduction gear 6 and a load shaft 7.

The auxiliary transmission AT comprises an epicyclic gearing G, in this case depicted in the form of a planetary stage known per se, comprising an annulus or ring gear 8, a plurality of planetary pinions 9, and a sun gear 10. The planetary pinions 9 are mounted on a common pinion carrier 11. The output shaft 2 of the engine E extends beyond the first pulley 4' and is operatively connected to one of the rotational members of the epicyclic gearing G, which in the example as depicted is the annulus or ring gear 8, acting as primary rotational member 41 of the epicyclic gearing G. The output shaft 5 is operatively coupled (in the situation as depicted through a coupling gear 12) to the pinion carrier 11, which acts as the secondary rotational member 42 of the epicyclic gearing G. For achieving a correctly functioning connection between the pinion carrier 11 and the coupling gear 12 of the output shaft 5, the pinion carrier 11 and the gear 12 should be coupled by a chain or the like. As an alternative, the coupling gear 12 could be coupled to the pinion gear carrier 11 by an intermediate gear wheel. For the sake of simplicity, neither such chain nor such intermediate gear wheel are illustrated in FIG. 2.

It is noted that, instead of using said reduction gear 6, the wheels L may be connected directly to the input shaft 5.

According to the invention, the third rotational member 43 of the epicyclic gearing G is associated with a flywheel function. The flywheel function may be provided by a separate flywheel F, operatively connected to said third rotational member 43, for instance via a tooth gearing, but such flywheel F may also be connected mechanically with said third rotational member 43. In the preferred example as depicted, the third rotational member 43 of the epicyclic gearing G is the sun gear 10. In such case, the sun gear 10 may itself function as flywheel F, or a separate flywheel F may be bolted against the sun gear 10.

According to an important aspect of the invention, the flywheel F may replace any flywheel of the engine E such as the flywheel usually present in a combustion engine or electrical motor, or the flywheel F may cause lower weight requirements therefor. I is noted that the functional configuration as discussed (wherein the flywheel F is operatively coupled to the sunwheel 10, the ring gear 8 is operatively coupled to the engine E and the pinion carrier 11 is operatively connected to the load L), is the preferred configuration. In principle, however, alternative configurations are also possible, wherein any first one of the rotational members 8, 10 and 11 of the epicyclic gearing is operatively coupled to the engine E, wherein any second one of the rotational members 8, 10 and 11 of the epicyclic gearing G is operatively coupled to the load L, and wherein a third one of the rotational members 8, 10 and 11 of the epicyclic gearing G is operatively coupled to the flywheel F.

Further, in the preferred operational configuration of the transmission system of the invention as illustrated in FIGS. 1B and 2, the main transmission MT is operatively coupled between the engine E and the load L. The combination of epicyclic gearing G and flywheel F is configured as an auxiliary transmission to the main transmission, in this case in the form of a CVT. However, the main transmission may be of any type, including automatic transmission. Further, the combination of epicyclic gearing G and flywheel F can be configured as main energy transmission component, whereas instead of the main transmission MT, an arbitrary transmission T can be used as secondary component for the combination of the epicyclic gearing G and the flywheel F. Such secondary transmission component T can be operatively connected between the first and second rotational members of the epicyclic gearing, as illustrated in the example, but this secondary transmission component T may also be operatively coupled between the first rotational member of the epicyclic gearing G (coupled to the engine E) and the third rotational member of the epicyclic gearing G (coupled to flywheel F), or it may be operatively connected between the second rotational member of the epicyclic gearing G (coupled to the load L) and the third rotational member of the epicyclic gearing (coupled to the flywheel F). These alternatives are illustrated diagrammatically in FIG. 3. In this diagrammatic abstraction, a drive system comprises at least three inertia components. i.e. drive energy source E, load L. and flywheel F, as well as two transmission components, i.e. epicyclic gearing G and transmission T. As mentioned, the transmission T may be a main transmission and the combination of epicyclic gearing G and flywheel F may be an auxiliary transmission for the main transmission MT, or the epicyclic gearing G may be a main transmission component and the transmission T may be an auxiliary transmission component for the epicyclic gearing G.

With reference to FIGS. 1B and 2, it is noted that the main transmission TMT and the auxiliary transmission AT are operatively coupled in parallel with respect to a power transfer from the engine E to the wheels L. Therefore, in any conceivable configuration, the spatial position of the main transmission MT and the auxiliary transmission AT can be interchanged.

Figure 3:
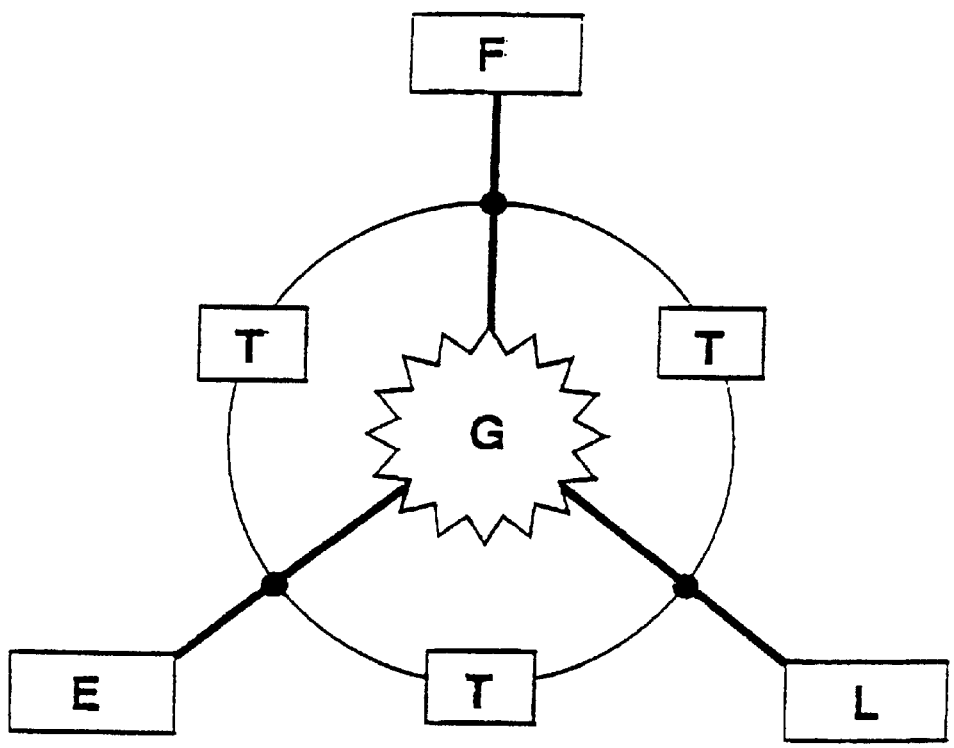
FIG. 3 is a diagram representing possible configurations according to the invention.
Figure 7A:
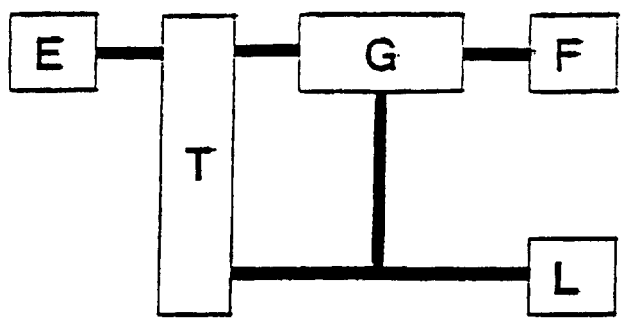
FIGS. 7A–C are schematically presentations of further configurations according to the invention.
Figure 7B:
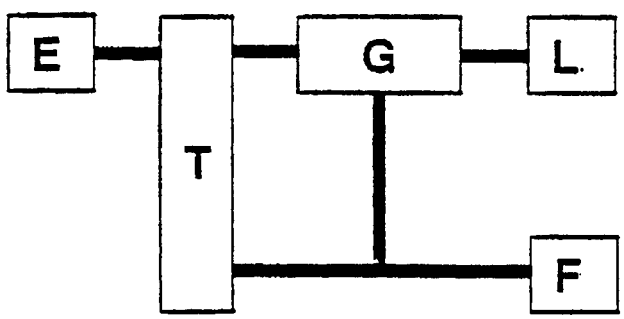
Figure 7C:
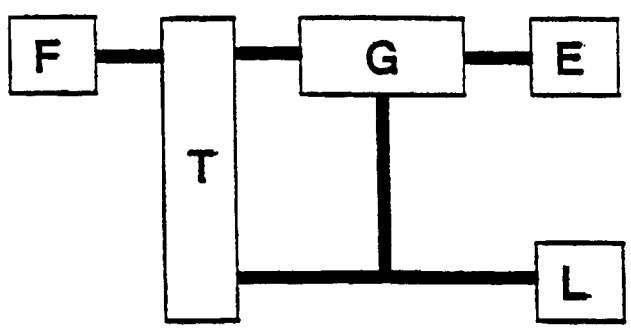

For a similar reason, in any conceivable configuration of the inertia components F, E and L and the two transmission components T and G, the spatial positions of the three inertia components F, E and L can be interchanged, as schematically illustrated in FIGS. 7A–C. The configuration of FIG. 7A corresponds to the configuration of FIG. 1B and FIG. 2. The alternative configuration of FIG. 7B is obtained by interchanging the positions of the load L and the flywheel F. The alternative configuration of FIG. 7C is obtained by, starting from the configuration of FIG. 7A, interchanging the positions of engine E and flywheel F, It will be appreciated that further alternatives are obtainable by simply interchanging the positions of epicyclic gearing G and transmission T, and/or by simply interchanging the positions of engine E, flywheel F and load L in respect of epicyclic gearing G and transmission T. However, the most practical configurations seem to be:

1) the configuration as schematically represented in FIG. 2, and
2) an alternative configuration where the transmission, as deductible from FIG. 3, is coupled between engine E and flywheel F and wherein load L is solely driven by a reaction member of epicyclic gearing G.

As further alternative, an epicyclic gearing may be used with a larger number of rotational members. In such alternative embodiments, such rotational members should be mutually coupled in such a way that three independent drive input/output functions result. According to the invention, the epicyclic gearing may be formed of any type of gearing, including Ravigneaux gear trains and differential gearings.

In all such embodiments of a transmission system according to the present invention, the proposed parallel arrangement of the epicyclic gearing G with the transmission unit MT/T utilises both the power splitting capabilities and power transmission capabilities of an epicyclic gearing. Its application according to the invention enables the flywheel to unload its kinetic energy to either the load or to the engine, or to both, depending on the circumstances. Further, according to the invention, any of the inertia components E, F, L may be replaced by alternative inertia components such as an electrical motor.

Figure 4:
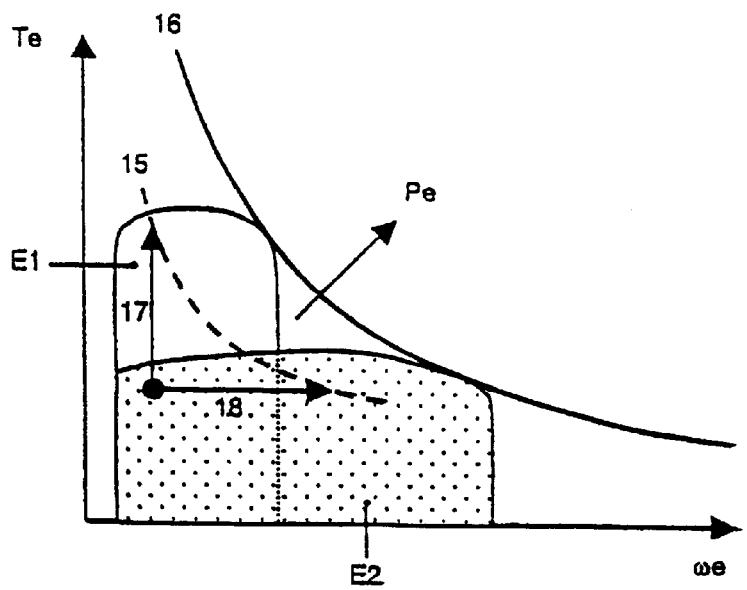
FIGS. 4 to 6 schematically illustrate the operation of and the effects reached by the invention.

In the following, the effects of a transmission system according to the invention will be explained with reference to FIGS. 4 to 6. FIG. 4 is a simplification of a so-called engine map, showing the characteristic curves of two different types of drive energy sources such as combustion engines E1 and E2. The horizontal X-axis of the graph represents the rotational speed ωe of a drive unit, and the vertical Y-axis represents the delivered torque Te. The area E1 represents the torque characteristics of more or less conventional type engines E1, capable of delivering relatively high torques but limited toe a relatively small range of rpm. Shaded area E2 represents the torque characteristics of a so-called high speed engine E2, which is capable of delivering its maximum torque over a larger range of rpm, but the maximum torque of this high speed engine E2 is lower than the maximum torque of the conventional engine E1.

Lines 15 and 16 are lines of constant power Pe (=Te·ωe). The engines E1 and E2 of this illustrative example are chosen such that they are capable of delivering the same maximum power as indicated by line 16. From FIG. 4 it can clearly be seen that engine E2 delivers its maximum power at a rotational speed much higher than the rotational speed at which the engine E1 delivers its maximum power.

Under normal driving conditions, the engines E1 and E2 operate in the neighbourhood of a working point indicated by a black solid circle. For the conventional engine E1, this working point is far below its maximum torque capability, which is favourable when quick acceleration is desired, but which is disadvantageous in that the engine E1 operates most of the time with low efficiency. In contrast, engine E2 is able to deliver even relatively low desired powers near its maximum torque, therefore at high efficiency. When acceleration is required, engine E1 may increase its delivered power almost instantaneously, as illustrated by the vertical arrow 17. In view of the fact the engine E2 works already near its maximum torque, it is necessary for the engine E2 to speed up, as indicated by the horizontal arrow 18, in order to be able to deliver the same high power output, indicated by the line 15. Speeding up the engine is done by "shifting gears"; in the illustrative example where the main transmission is a CVT, speeding up the engine is done by said control means of said CVT actuating means, which controls the transmission ratio of the CVT to a lower value. It takes some time for the engine E2 to increase its revolutions, particularly when departing from low rotational speed of the engine, so the acceleration response of the engine E2 is poor. The delay in reaching the required higher rotational speed of the engine is caused by inertia within the engine E2 and inertia coupled thereto. Such delay is undesirable, particularly in the case of the application of a transmission system in a motor vehicle; the delay is not only irritating to the driver, but it may even be dangerous in accidental traffic situations.

In the transmission system according to the present invention, the above-mentioned time delay is eliminated or at least largely reduced, because the transmission system allows kinetic energy from the flywheel to be transferred to the engine. Hereby, the rotational speed of the flywheel decreases while simultaneously the rotational speed of the engine is increased. This energy transfer can be relatively fast, so that the engine E can be brought relatively quick to a relatively high rotational speed, allowing the engine to deliver relatively high power.

In other words, the transmission system of the present invention allows a relatively light engine E2 to be used, which under normal circumstances, i.e. normal driving conditions, operates at relatively high efficiency so that the disadvantages of a conventional type engine E1 are avoided, while the principal disadvantages such as a poor acceleration response of a high speed engine E2 are overcome because the flywheel F, through the auxiliary transmission AT, assists the engine E2 in reaching a higher rotational speed where the engine can deliver more power. The combination of such a relatively high speed engine E2 and the transmission system of the present invention offers favourable driving characteristics in combination with an efficient performance.

Figure 5:
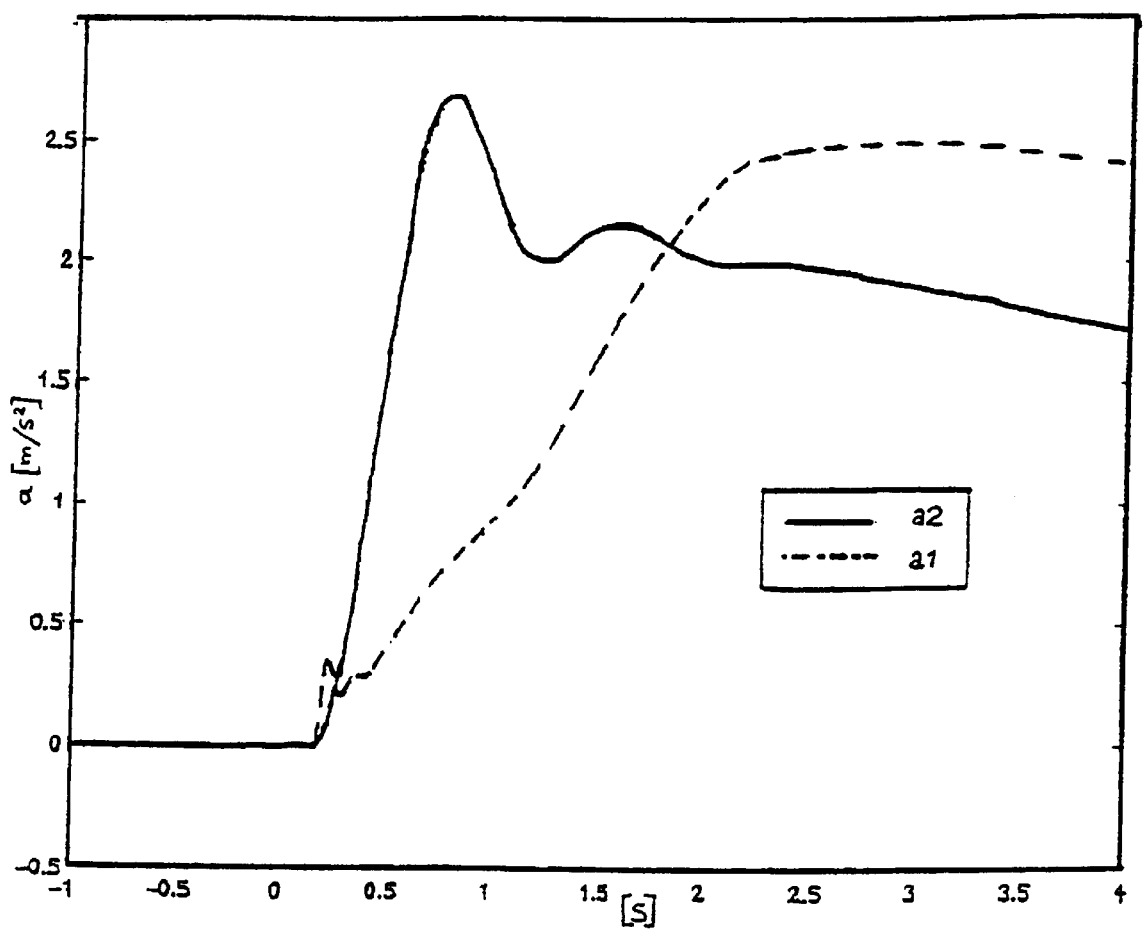

FIG. 5 illustrates the acceleration response of a vehicle equipped with a high revolution combustion engine E2. The horizontal axes of FIG. 5 represents time, whereas the vertical axis of this graph represents acceleration. The broken line A1 illustrates the performance of the engine E2 in a conventional situation, i.e. where the engine E2 is only coupled to the wheels through the main transmission MT (see FIG. 1A). From this graph A1, it can be seen that acceleration is relatively slow. The solid line A2 shows the performance of the same engine, but now provided with a transmission system according to the invention (see FIG. 1B): it will be evident, that the acceleration rises much quicker now.

Figure 6:
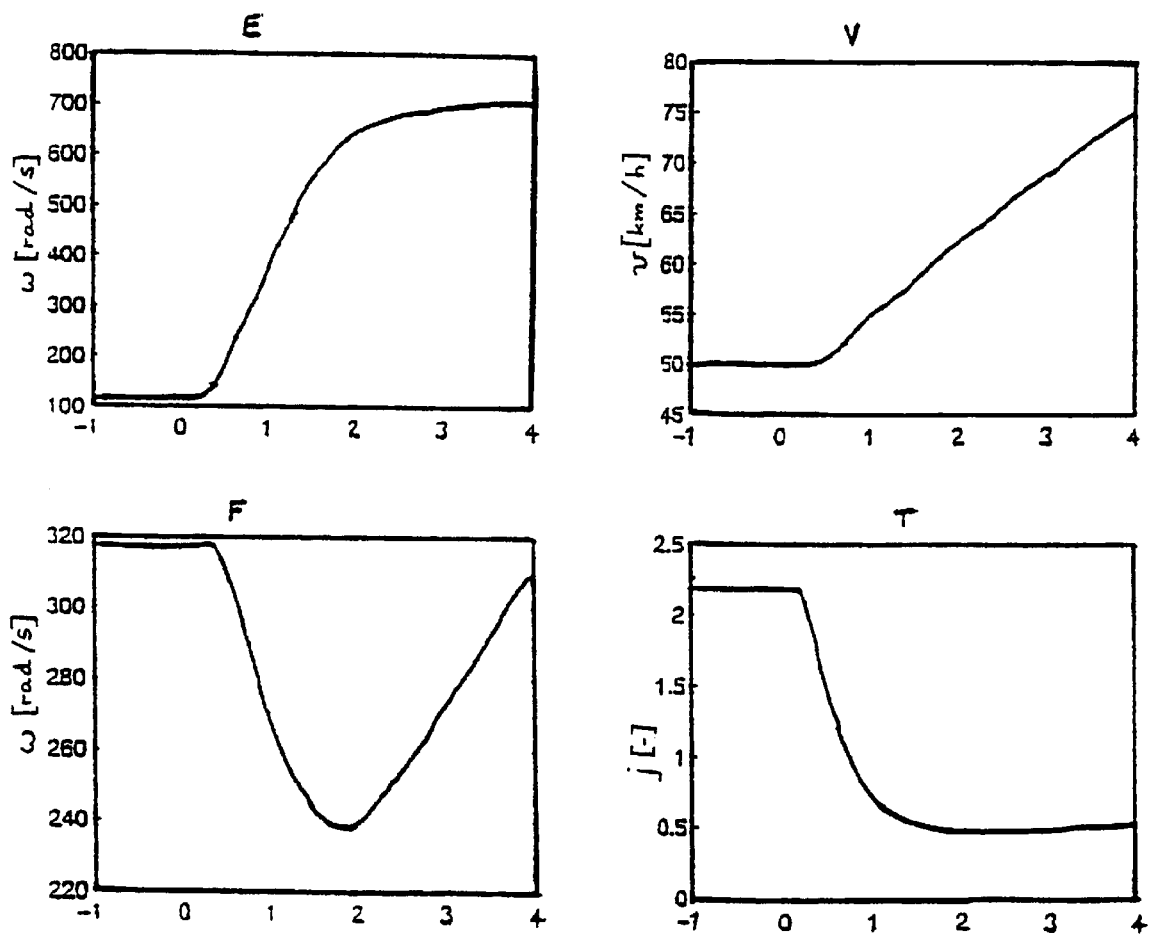

FIG. 6 contains four graphs illustrating, as function of the time, the rotational speed of the engine E (top left), the rotational speed of the flywheel F (bottom left), and the speed of the vehicle V (top right), In the bottom right graph of FIG. 6, the corresponding transmission ratio j of the main transmission MT (CVT) is shown.

Figure 8A:
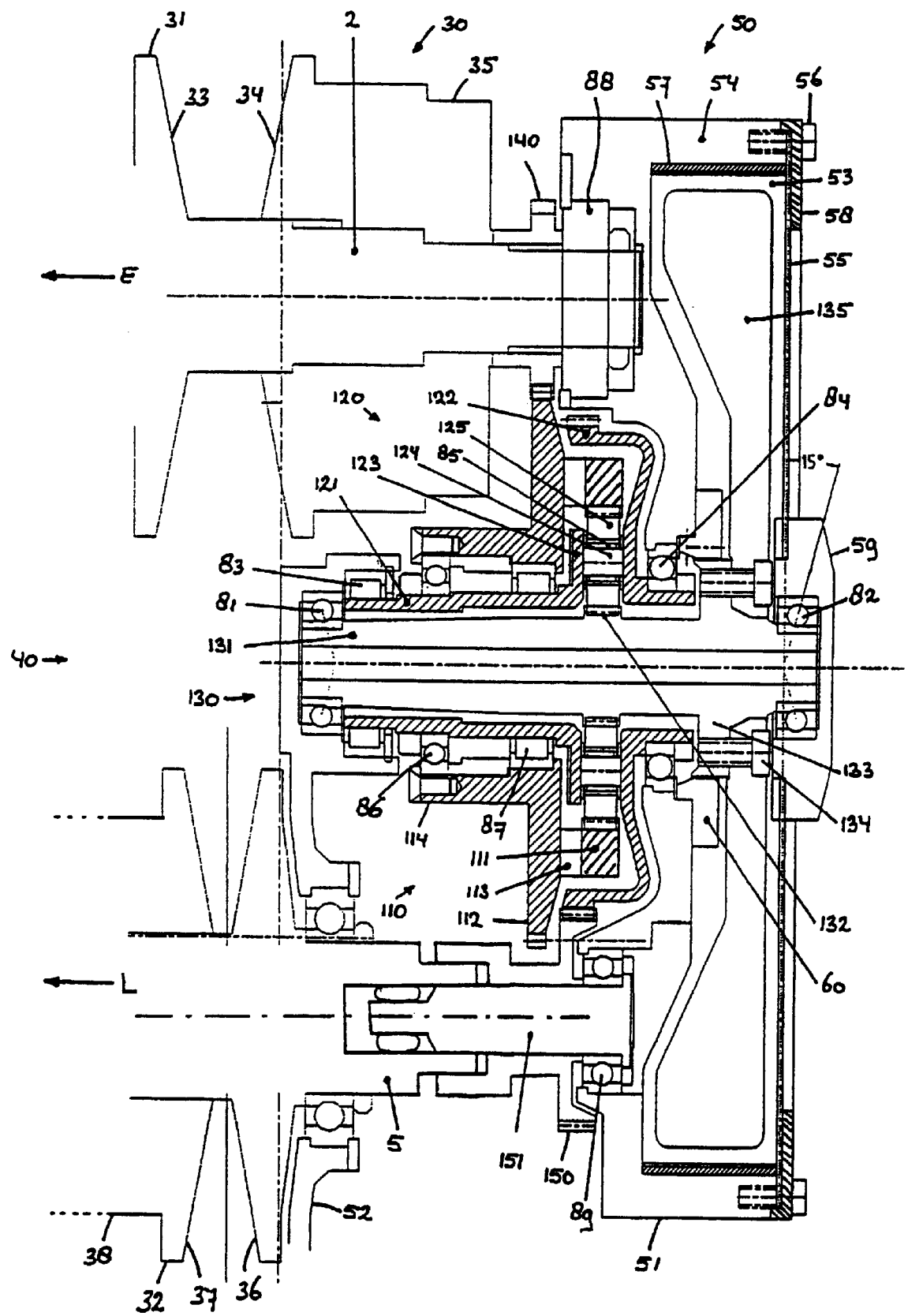
FIG. 8A is a side elevation, partly in cross-section, of a preferred embodiment of a transmission system according to the invention.

FIG. 8A shows, in more detail, the construction of a preferred embodiment of a transmission system according to the invention, generally indicated by reference number 40. This embodiment of the transmission system 40 is of the type illustrated in FIG. 1B, comprising a main transmission (MT) 30 and an auxiliary transmission (AT) 50. The main transmission 30 in this embodiment is a CVT, comprising a first pulley 31 and a second pulley 32. The two pulleys 31 and 32 are coupled by a push belt, which is not shown in FIG. 8A. The first pulley 31 comprises a stationary pulley sheave 33 and a movable pulley sheave 34 which is movable axially with respect to the stationary pulley sheave 33. The stationary pulley sheave 33 is fixedly connected to a primary shaft 2, which is coupled to an engine which is not shown in FIG. 8A. The primary shaft 2 can be the output shaft of such engine, or it can be coupled to such output shaft. With respect to the two pulley sheaves 33 and 34, the engine is located at the side of the stationary pulley sheave 33, i.e. to the left-hand side of the pulley 31 in FIG. 8A. The location of the engine is indicated by arrow E in FIG. 8A. The axial position of the movable pulley sheave 34 can be adjusted by pressure means 35 activated by suitable control means not shown in FIG. 8A.

The second pulley 32 comprises a stationary pulley sheave 36 and a movable pulley sheave 37. The stationary pulley sheave 36 is fixedly connected to a secondary shaft 5, which is oriented parallel to primary shaft 2. The movable pulley sheave 37 is axially movable with respect to the stationary pulley sheave 36 by pressure means 38 activated by said control means. The orientation of the second pulley 32 is opposite to the orientation of the first pulley 31, i.e. the movable pulley sheave 37 is directed to the engine E. In other words, in FIG. 8A, the movable pulley sheave 34 of the first pulley 31 is located on the right-hand side of the stationary pulley sheave 33, whereas the movable pulley sheave 37 of the second pulley 32 is located on the left-had side of the stationary pulley sheave 36.

The stationary pulley sheave 33 and 36 may be formed integrally with the primary shaft 2 and the secondary shaft 5, respectively.

In FIGS. 1A and 1B, which are intended only for explaining the function of the main and auxiliary transmissions, the engine E is shown to the left of the main transmission MT while the load L is shown to the right of main transmission MT. In reality, it is possible, indeed, to have the primary shaft 2 and the secondary shaft 5 extend in opposite directions from the main transmission MT. However, in the preferred embodiment as illustrated in FIG. 8A, the secondary shaft 5 extends, for connection to the load L (wheels of a vehicle), towards the same direction as the direction in which the primary shaft 2 extends for connection to the engine E. Although the means for connecting the secondary shaft 5 to the load L are not shown in FIG. 8A, the direction in which the secondary shaft 5 extends for connection to the load L is shown in FIG. 8A by arrow L. The primary shaft 2 and the secondary shaft 5 extend, as seen from the engine E and the load L, respectively, beyond the first pulley 31 and the second pulley 32, respectively, in the same direction, i.e. to the right in FIG. 8A, for coupling with the auxiliary transmission 50. To this end, the primary shaft 2 and the secondary shaft 5 may be provided with extension pieces, or they may be manufactured with a larger length than the standard shafts, as will be clear to a person skilled in the art.

The fact that the primary shaft 2 and the secondary shaft 5 extend in the same direction for coupling with the auxiliary transmission 50 allows for a compact build-up of the transmission system 40, i.e. the combination of main transmission 30 and auxiliary transmission 50. Further, the fact that the primary shaft 2 and the secondary shaft 5 extend in the same direction for coupling with the auxiliary transmission 50 allows for a flywheel to extend beyond the primary and secondary shafts 2 and 5, as will be explained in more detail later.

The main transmission 30 is, in principle, a standard product. The shafts 2 and 5 are mounted in a housing, supported by bearings. Such housing, which is not shown in FIG. 8A, would comprise a main housing part which would accommodate the pulleys and the bearings on the engine-side (left-hand side in FIG. 8A) of the pulleys 31 and 32. The housing would further comprise a lid-like housing part which is to be connected to said main housing part, and which comprises the bearings on the opposite side (right hand side in FIG. 8A) of the pulleys 31 and 32. The auxiliary transmission 50 is preferably formed as an auxiliary transmission unit which can be mounted in replacement of said lid-like housing part of the main transmission. Thus, the combination of main transmission 30 and auxiliary transmission 50 would provide a combined, integrated unit, the costs of which can be relatively low in a view of the fact that the housing for the main transmission 30 would be standard housing.

The auxiliary transmission 50 comprises a housing 51, 52. A first housing part 52 is formed as a lid replacing part of the above-mentioned lid-like housing part of the standard housing of the main transmission 30, and which is adapted for mounting to the main housing part (not shown) of the standard housing of the main transmission 30. The first housing part 52 supports the secondary shaft 5. Further, on its outer surface (i.e. directed away from the main transmission 30 ), the first housing part 52 supports bearings of the auxiliary transmission 50, as will be described in more detail.

A second housing part 51, which carries the functional transmission components of the auxiliary transmission 50, is formed as a lid adapted for mounting to the combination of the first housing part 52 and the main housing part (not shown) of the standard housing of the main transmission 30. The first housing part 52 is open for fluid communication between the auxiliary transmission 50 and the main transmission 30, such that lubrication oil may freely pass from the main transmission 30 to the functional transmission components of the auxiliary transmission 50.

The auxiliary transmission 50 is, in the preferred embodiment as shown in FIG. 8A, a planetary stage having three rotational members 110, 120 and 130. The heart of the auxiliary transmission 50 is formed by a central shaft 131 which extends axially in a direction parallel to the directions of the primary shaft 2 and the secondary shaft 5. The central shaft 131 is provided with teeth 132, at an almost central position along the length of the central shaft 131. These teeth perform the function of sun gear in the planetary stage 50, and are formed integrally with the central shaft 131. As an alternative, a separate sun gear may be fixed to the central shaft.

The central shaft 131 further comprises a flange 133. A flywheel 135 is fixed to the central shaft 131, by means of bolts 134 which are screwed into the flange 133.

The third rotational member 130 is supported for rotation in the housing 51, 52. A first ball bearing 81 is located at a first end of the central shaft 131, which is directed towards the main transmission 30. A second ball bearing 82 is located at the opposite end of the central shaft 131, which is close to the axial position of the flywheel 135 with respect to the central shaft 131. As can be seen clearly in FIG. 8A, the housing 51 completely surrounds the flywheel 135. More particularly, the housing 51 defines a chamber 53 accommodating the flywheel 135, the chamber 53 having a side wall 54. The chamber 53 is closed by a plate 55 which is screwed onto the side walls 54 of the chamber 53 by means of bolts 56. The inner surface of the side wall 54 is reinforced by a first safety ring in the form of a cylinder, which surrounds the flywheel 135 radially. A second, annular safety ring 58, which is connected to the side wall 54 by means of said bolts 56, is provided for additional safety. Said safety rings 57 and 58 are not essential for the correct functioning of the auxiliary transmission, but are merely provided as a safety measure. In case of failure of the flywheel, unlikely as it is, said safety rings 57 and 58 prevent pieces of flywheel to be launched away.

The plate 55 has a central hole through which the central shaft 131 extends. A cap 59 is connected to the plate 55, said cap 59 carrying the second ball bearing 82.

The first ball bearing 81 provides for radial stiffness in the position of said first end of the central shaft 131, while the second ball bearing 82 provides for radial stiffness in the position of the second end of the central shaft 131. However, the ball bearings 81 and 82 also have an axial bearing component. More particularly, instead of being a normal ball bearing having a purely radial bearing function, the bearings 81 and 82 have a bearing function in a direction which makes an angle of approximately 15° with respect to a plane normal to the central axis of the central shaft 131, as indicated in FIG. 8A. Thus, the bearing function of the bearings 81 and 82 defines a cone around the central axis of the central shaft 131, such cone having a top angle of about 150°. The axial position of the second ball bearing 82 with respect to the central shaft 131 is chosen such that the top of said cone substantially coincides with the central plane of the plate 55.

The housing 52 which carries the first ball bearing 81 is stiff to such extent, that the first ball bearing 81 provides axial stiffness to the central shaft 131. However, the plate 55 is chosen such as to provide relatively little stiffness in the axial direction of the central shaft 131. In other words: the plate 55 has some properties of a membrane. This means that the central shaft 131 has a small freedom to move axially away from the main transmission 30, i.e. in the right hand direction in FIG. 8A. This freedom can be restricted by mounting the plate 55 in a prestressed condition wherein the plate 55 exerts an axial force (towards the left in FIG. 8A) on the central shaft 131.

A third safety ring 60 is connected to the housing 51 by connection means not shown in FIG. 8A. This third safety ring 60 surrounds the flange 133 of the third rotational member 130, with a small gap being present between the flange 133 and the third safety ring 60. The function of the third safety ring 60 is to catch the flange 133 and to guide the central shaft 131 in case of an unbalance. However, under normal conditions the play between the third safety ring 60 and the flange 133 is such that the flange 133 and the third safety ring 60 do not touch each other.

It is, of course, also possible to form the support for the second bearing 82 in such a way that the second ball bearing 82 provides for adequate axial stiffness, for instance by using, instead of the relatively thin plate 55, a relatively thick housing part which is strengthened in the axial direction for providing axial stiffness. However, such a housing part would add substantially to the overall weight of the construction. Further, it would be very difficult to dimension housing parts in such a way that a precise amount of axial restrainment power is exerted. After all, if such housing part is bolted to the housing 51 by means of the bolts 56, it may be that the second ball bearing 82 shows to much axial play or, alternatively, it may be that the bolts 56 are tightened and the play in the ball bearing 82 is reduced to zero, the bolts 56 can be screwed further so that a relatively large axial pressure is exerted in the ball bearings 81 and 82 which will cause a relatively large amount of wear and tear in these bearings. These problems are avoided by using the plate 55 which has relatively little axial stiffness.

If, however, it would be considered desirable to increase the axial stiffness of the second ball bearing 82, it is possible to make the central shaft 131 hollow (as shown), to provide a central bore hole in the cap 59 and to have a mounting pin extending through such bore hole in the cap 59 and through the hollow core of the central shaft 131, connected (for instance: by means of screw thread) to the housing 52. By screwing a nut on the free end of such mounting shaft which extends through said hole in the cap 59, until such nut would rest against the cap 59, the axial stiffness would be assured. It would also be possible to place a resilient member such as a helical spring between such nut and the cap 59, the spring being compressed as the nut is screwed further in order to be able to adjust the axial stiffness of the second ball bearing 82.

In such a case, the axial stiffness would be provided fully by such connecting pin, while the plate 55 would only provide the radial stiffness.

Even if such connecting pin is not used, it is advantageous to have the central shaft 131 be hollow (as shown in FIG. 8A), because material near the central axis of the central shaft 131 adds to the weight but does not appreciably add to the inertia of this shaft.

The second rotational member 120 comprises a substantially cylindrical support part 121 which surrounds the central shaft 131, and which extends from a first end near the first ball bearing 81 of the central shaft 131 to a second end near the flange 133 of the central shaft 131. Near said first end, the support part 121 is supported by a third bearing 83 with respect to the housing 52, the third bearing 83 being a cylindrical bearing.

Near the second end, the cylindrical support part 121 is supported with respect to the housing 51 by means of a fourth ball bearing 84. Next to said fourth ball bearing 84, the support part 121 is provided with a first flange 122, extending substantially radially with respect to the central axis of the support part 121. A second flange 123 is located at an axial distance from the first flange 122, away from the flywheel 135. Between the first and the second flanges 122 and 123, pinion carrier shafts 124 are mounted, parallel to the central axis of the central shaft 131. Each pinion carrier shaft 124 carries a planetary pinion 125, by means of a needle bearing 85.

The axial position of the planetary pinions 125 corresponds with the axial position of the sun gear 132, and the planetary pinions 125 are in meshed contact with the sun gear 132. In FIG. 8A, only two planetary pinions 125 are shown; however, in the preferred embodiment, the number of planetary pinions 125 equals 3, although this number can, in principle, be chosen anywhere in the range from 2–8.

The primary rotational member 110 comprises an annulus or ring gear 111, which extends around the planetary pinions 125. The ring gear 111 has an inner circumferential surface provided with teeth which are in meshed contact with the planetary pinions 125. The ring gear 111 is directly driven by the primary shaft 2, as will be explained later, although the ring gear 111 may, as an alternative, also be coupled with the secondary shaft 5. The coupling between the ring gear 111 and the primary shaft 2 (or secondary shaft 5) may be by means of a belt or chain or the like, but preferably, and as implemented in the preferred embodiment illustrated in FIG. 8A, the coupling between the primary shaft 2 and the ring gear 111 is by means of externally toothed members. For such toothed coupling, the ring gear 111 itself may be provided with teeth on its external circumferential surface. In the embodiment as illustrated, however, the primary rotational member 110 comprises a substantially dish-like ring carrier 112, which is located beside the flange 123 of the secondary rotational member 120, and which carries the ring gear 111. The ring gear 111 and the dish-like ring carrier 112 may be formed integrally as one piece, or the ring gear 111 may be connected to the ring carrier 112, for instance by means of bolts (not shown) while the axial distance between the ring gear 111 and the ring carrier 112 may be defined by distance pieces 113. However, preferably the ring gear 111 is coupled to the ring carrier 112 by means of coupling means which assure an axially and tangentially rigid connection but which allow the ring gear 111 some radial freedom with respect to the ring carrier 112, in order to allow the ring gear 111 to follow an axial position as dictated by the planetary pinions 125.

On the side opposite to the ring gear 111, the ring carrier 112 is extended axially by a substantially cylindrical piece 114. Preferably, as shown. the cylindrical piece 114 and the ring carrier 112 are formed integrally as one piece. The combination of the cylindrical piece 114 and the ring carrier 112 extends axially between the housing 52 and the flange 123 of the secondary rotational member 120, and is rotatably supported by the secondary rotational member 120 by means of a sixth ball bearing 86 and a seventh bearing 87, this seventh bearing being a cylindrical bearing.

The cylindrical portion 114 of the primary rotational member 110 has an axial length allowing the sixth and seventh bearings 86 and 87 to have sufficient axial distance for providing axial stability to the primary rotational member 110. In cases where these requirements for the two bearings 86 and 87 are lessened, such that the axial distance between the two bearings 86 and 87 may be lessened or the sixth ball bearing 86 may be left away completely, the length of the cylindrical portion 114 may be lessened or the cylindrical portion 114 may be left away completely, thus allowing for a shorter overall length of the auxiliary transmission 50.

The primary rotational member 110 of the auxiliary transmission 50 is coupled with the primary shaft 2. It is possible that such coupling is provided by a belt or chain or the like, but preferably this coupling is provided by a tooth gearing. To this end, the primary rotational member 110 is provided with external teeth. Although in principle such external teeth may be provided on any external surface of the primary rotational member 110, these external teeth are, in the preferred embodiment as shown in FIG. 8A, arranged on the peripheral edge of the ring carrier 112.

The external teeth of the primary rotational member 110 are in meshed contact with a primary coupling gear 140. This primary coupling gear 140 can be fixed on the primary shaft 2 of the main transmission 30 by any suitable means, so that the primary coupling gear 140 may be considered as part of the main transmission 30. In such a case, the free end of the primary shaft 2, i.e. the right-hand end of the primary shaft 2 in FIG. 8A, might be rotatably supported by the housing 51 by means of a ball bearing or the like. It would also be possible for the first housing portion 52 to support the bearing means for the primary shaft 2. However, in the embodiment as shown in FIG. 8A, the primary coupling gear 140 is considered as being part of the auxiliary transmission unit 50, and said primary coupling gear 140 is rotatably supported by the housing 51 by means of an eighth ball bearing 88. The axial position of the primary coupling gear 140 with respect to the housing 51 is fixed. The primary coupling gear 140 is coupled for rotation with the primary shaft 2, but has axial freedom with respect to the primary shaft 2. This is achieved by the primary shaft 2 and the primary coupling gear 140 having matching key ways.

In the embodiment as shown, the primary coupling gear 140 comprises a hollow, cylindrical portion which has inner key ways on its inner cylindrical surface, while the primary shaft 2 is provided with external key ways on its free end. However, other constructions are possible too.

The secondary rotational member 120 of the auxiliary transmission 50 is coupled with the secondary shaft 5. It is possible that such coupling is provided by a belt or chain or the like, but preferably this coupling is provided by a tooth gearing. To this end, the secondary rotational member 120 is provided with external teeth. In principle, such teeth may be provided on any suitable portion anywhere along the length of the secondary rotational member 120. In a favourable embodiment as shown in FIG. 8A, the external teeth are provided on an external circumferential surface of the first flange 122. The first flange 122 may, in principle, have the general shape of a flat disc. However, in order to provide a compact arrangement of the auxiliary transmission unit 50, it is preferred to have a relatively large axial distance between the external teeth of the secondary member 120 on the one hand and the flywheel 135 on the other hand. Therefore, the first flange 122 of the secondary rotational member 120 has in general the shape of a shallow pan, i.e. the first flange 122 comprises a first portion which extends generally radially with respect to the central axis of the second rotational member 120, and a second portion which extends generally axially and surrounds the ring gear 111 of the first rotational member 110. Preferably, said first radial portion and said second cylindrical portion are formed integrally as a whole. As shown in FIG. 8A, the external teeth of the second rotational member 120 are formed near the free rim of this pan-like member. By such an arrangement, the axial distance between the flywheel 135 and the external teeth of the second rotational member 120 is larger than the axial distance between the flywheel 135 and the axial position of the first flange 122. In fact, said axial distance can be larger than the axial distance between the flywheel 135 and the sun gear 132, as shown.

The external teeth of the secondary rotational member 120 are in meshed contact with a secondary coupling gear 150. This secondary coupling gear 150 is coupled for rotation with the secondary shaft 5. In principle, the secondary coupling gear 150 can be formed as part of the secondary shaft 5, similarly as stated above with respect to the primary coupling gear 140 and the primary shaft 2. However, in the preferred embodiment as shown in FIG. 8A, the secondary coupling gear 150 is part of the auxiliary transmission unit 50. The secondary coupling gear 150 is mounted on a coupling shaft 151, which is rotatably supported by the housing 51 by means of a ninth ball bearing 89. The coupling shaft 151 and the secondary coupling gear 150 are fixedly connected to each other, and they may be formed integrally.

The secondary coupling gear 150 is coupled for rotation with the secondary shaft 5, but has axial freedom with respect to the secondary shaft 5. In the illustrated embodiment, this is achieved by the secondary coupling gear 150 having internal key ways which match with external key ways on the secondary shaft 5. However, other constructions are possible, too.

With such an arrangement where the primary coupling gear 140 and the secondary coupling gear 150 are part of the auxiliary transmission unit 50 and are axially slidable with respect to the primary and secondary shafts, respectively, it is possible to easily remove the auxiliary transmission unit 50, including the housing 51, the three rotational members 110, 120 and 130, and also including the primary coupling gear 140 and the secondary coupling gear 150, by displacing the auxiliary transmission unit 50 axially in a direction away from the main transmission 30, i.e. towards the right in FIG. 8A. Likewise, it is possible to easily mount the auxiliary transmission unit 50 onto the main transmission 30.

For a correct functioning of the assembly, the teeth of the primary rotational member 110 of the auxiliary transmission 50 on the one hand and the teeth of the primary coupling gear 140 on the other hand may be orientated exactly axially, but preferably the are orientated along helical lines in order to reduce variations in power transfer due to teeth coming out of and into mesh. The same applies for the teeth of the secondary rotational member 120 of the auxiliary transmission 50 on the one hand and the teeth of the secondary coupling gear 150 on the other hand. Due to such helical orientation of the toothings, the mutual force between such gearing is not directed exactly tangentially but this force has an axial component. In a preferred embodiment, the helical orientation of the toothings of the primary rotational member 110 and the primary coupling gear 140 is opposite to the helical orientation of the toothings of the secondary rotational member 120 and the secondary coupling gear 150, such that the axial force components in such couplings are compensating each other in some extent.

An important advantageous feature of the transmission system offered by the invention is that the components of the auxiliary transmission, excluding the flywheel, can be accommodated in the space available between the primary shaft 2 and the secondary shaft 5 of the main transmission 30, in situations where the primary shaft 2 and the secondary shaft 5 extend next to each other at a certain distance, as is the case with a continuously variable transmission of the push belt type. Thus, in the axial direction, there is a certain amount of overlap in the lengths of the primary shaft 2, the secondary shaft 5 and the central shaft 131 of the auxiliary transmission 50. This overlap can be approximately 15 cm. This means that the invention makes very efficient use of the space available in the engine room of a motor vehicle. Seen in the axial direction, the length of the transmission system is increased mainly by the axial dimension of the flywheel 135, as compared with the axial length of the main transmission (CVT) 30.

Figure 8B:
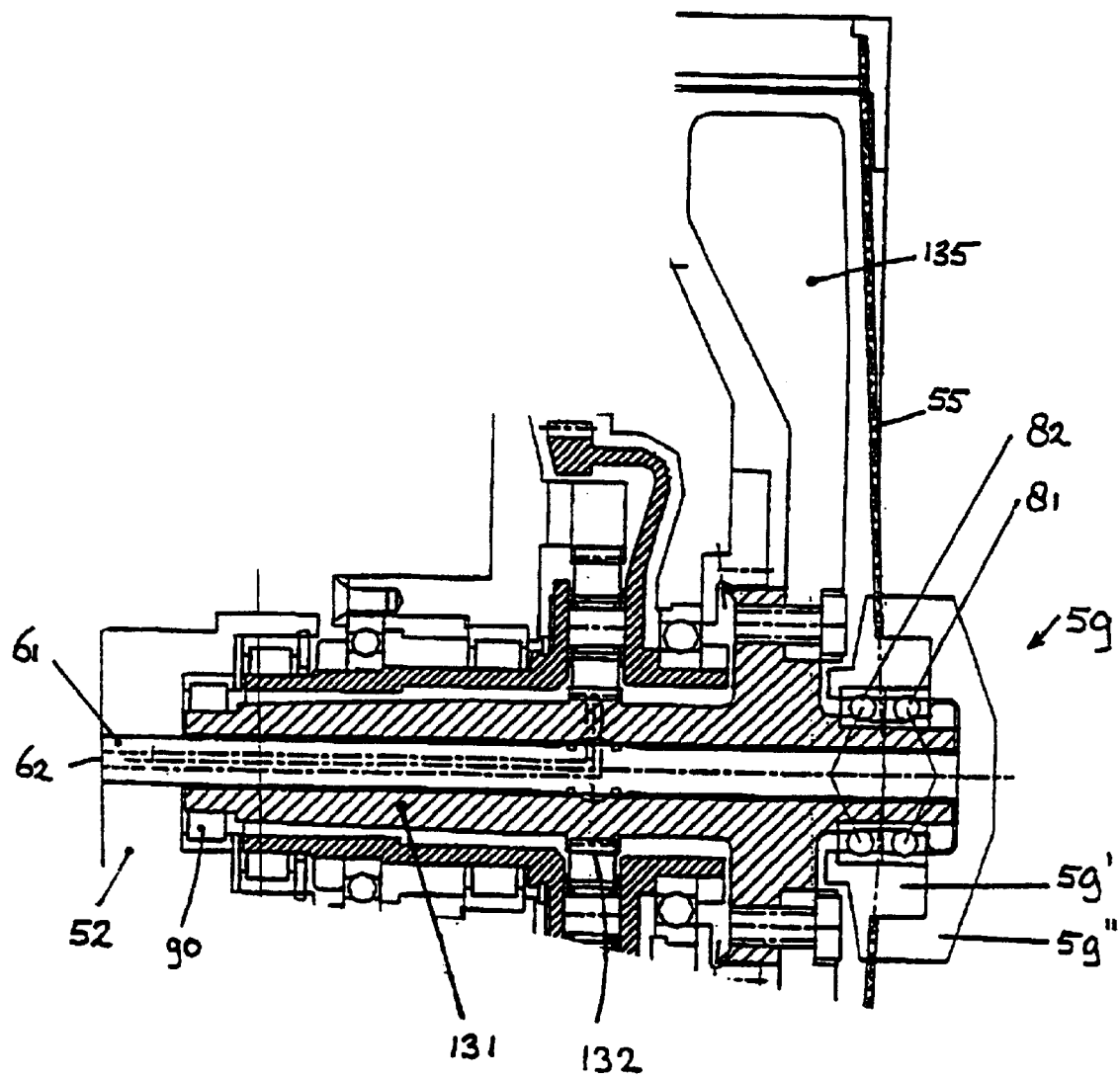
FIG. 8B is a side elevation showing part of a modification of the embodiment of FIG. 8A.

FIG. 8B shows a detail of a modification of the embodiment of FIG. 8A. In the embodiment of FIG. 8B, the left-hand end of the central shaft 131 is rotatably supported by a cylindrical bearing 90, whereas the opposite end of the central shaft 131 is supported by the two ball bearings 81 and 82, both mounted in the cap 59. The cap 59 comprises two cap-halves 59' and 59", which are screwed together, and which clamp between them said two ball bearings 81, 82 as well as the plate 55.

A support pin 61 extends through the length of the hollow central shaft 131, and is screwed into the housing 52 with its left-hand end and into the cap 59 with its right-hand end. This support pin 61 provides the axial stiffness for the bearing of the central shaft 131, the radial stiffness being provided by the plate 55.

An axial channel 62 extends through the support pin 61, from the left-hand end of the support pin 61, where said channel 62 communicates with lubrication supply means (not shown), to a branch portion opening into the side wall of the pin 61 and communicating with a boring in the central shaft 131, at or near the position of the sun gear 132, for lubricating the gears of the planetary stage.

Figure 9:
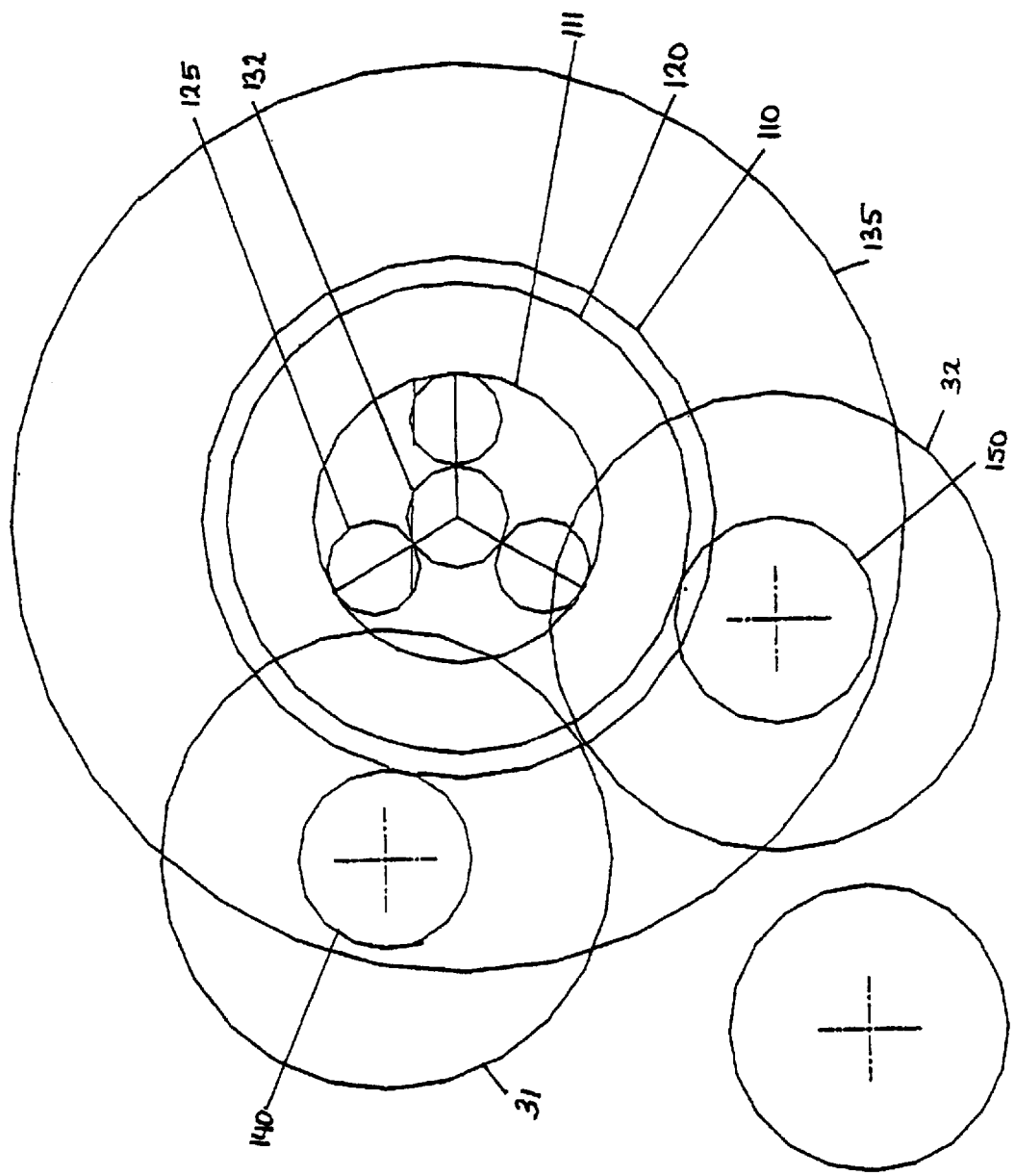
FIG. 9 illustrates the spatial position of the main axes of the transmission system in the embodiment of FIG. 8A.

FIG. 9 shows schematically a cross-section of the transmission system of FIG. 8A, according to a plane perpendicular to the rotational shafts 2, 5 and 131. In FIG. 9, the points were the central axes of the primary shaft 2, the secondary shaft 5 and the central shaft 131 intersect said plane, which coincides with the plane of drawing, are indicated as P, S and Q, respectively. Further, the mutual positions of the primary coupling gear 140, the secondary coupling gear 150, the outer toothing of the primary rotational member 110, the outer toothing of the secondary rotational member 120, the inner toothing of the ring gear 111, the toothing of the planetary pinions 125, and the toothing of the sun gear 132 are shown, as projected onto the plane of drawing. Further, the outer circumference of the flywheel 135 is indicated. It is clearly shown in FIG. 9 that the diameter of the flywheel 135 can be such that, in the projection shown in FIG. 9, the flywheel 135 overlaps at least partially the primary shaft 2 and the secondary shaft 5, due to the fact that the free end of the primary shaft 2 and the secondary shaft 5 are both facing away from the engine E and are both accessible for coupling with the auxiliary transmission unit 50.

In principle, the transmission ratios between the gear members of the transmission system according to the invention can be chosen at a suitable value in the range of 1:1 to approximately 1:5, however, preferably such transmission ratios are never larger than 1:3.

An important feature of the transmission system according to the invention is that the rotational speed or the flywheel 135 is not fixed by the rotational speed of the primary shaft 2 or by the rotational speed of the secondary shaft 5. This allows for an optimal combination of transmission ratios between the transmission gearing components in the auxiliary transmission 50 and the inertia of the flywheel 135 to be designed. The transmission ratios are chosen such that at maximum velocity of the vehicle, the rotational speed of the flywheel 135 is approximately 8000–9000 rpm This maximum rotational speed, i.e. the maximum rotational speed to be expected under normal driving conditions, is much lower than is customary for a flywheel design; more particularly, this maximum rotational velocity is in the same order as customary for the rotational speeds of an automotive engine, and it allows for relatively moderated requirements on the material to be used for the flywheel. In view of the relatively moderate rotational speed of the flywheel 135, the stresses within the flywheel remain moderate during operation, and the flywheel 135 may be manufactured from a relatively low cost steel.

Further, it is customary for a flywheel to have a rather large weight. According to the present invention, however, the weight of the flywheel 135 can be relatively low, in the order of 20 kg or less. The width (axial length) can be in the order of 5 cm or less, and the diameter can be in the order of 40 cm or less. As illustrated in FIG. 8A, the flywheel 135 preferably has a relatively low inertia in its central portion and a relatively large inertia in its peripheral portion. To this end, the central portion may be relatively thin (axial length), while the weight of this portion may be further reduced by through holes. The peripheral portion has increased thickness with respect to the central portion, and is preferably solid. It is preferred to avoid steep and discontinuous transitions in thickness, therefore an intermediate portion with inclined thickness matches the thick peripheral portion with the thin central portion.

In an adequate example, the outer diameter of the flywheel 135 is approximately 35 cm, while the inner diameter of the peripheral portion is about 0.7–0.8 times the outer diameter. The axial dimension of the peripheral portion is about 4 cm, while the axial dimension of the central portion is about 1 cm. Thus, the weight of the peripheral portion can be about 15–16 kg, while the weight of the remainder of the flywheel can be about 3 kg.

When rotating at approximately 8000 rpm, the kinetic energy content in the flywheel 135 is about 140–150 kJ. In practice, a designer can increase or decrease this value, depending on the required properties of the flywheel assist. In general, one might consider that in practice it would be desirable to be able to assist an engine in speeding up from approximately 1000 rpm to approximately 6000 rpm. The increase in kinetic energy in the engine, which can be calculated as $0.5 \cdot J_e \cdot ((2\pi \cdot 100) - (2\pi \cdot 16)^2)$, should correspond to the kinetic energy content in the flywheel 135 at approximately 8000 rpm. Further, inertia $J_f$ of the flywheel 135 in combination with the reductions in the epicyclic system should preferably be chosen such that the flywheel delivers practically all its kinetic energy to the system when speeding up the engine. This effect is achieved with the embodiment described herein.

Further, it is preferred that the play between the flywheel 135 and the housing, especially near the outer portion of the flywheel, is in the order of 0.03 or more times the outer radius of the flywheel, i.e. about 5 mm or more.

From a functional point of view, the flywheel 135 can be coupled to any of the main rotational members of the epicyclic gearing (sun gear, planet carrier, ring gear), while the other two main components of the epicyclic gearing are coupled to the primary shaft 2 and the secondary shaft 5, respectively. However, it is considered as very favourable to have the flywheel 135 and the sun gear 132 arranged on a common shaft. One of the favourable features of such arrangement is that it provides relatively low reductions and speed within the epicyclic gearing, which means a relatively high internal efficiency and relatively low friction losses.

A further favourable feature of the transmission system according to the invention is that, under normal driving conditions, the three main components of the epicyclic gearing, i.e. the planetary pinion carrier assembly 120, the ring assembly 110, and the combination of sun gear assembly 130 with flywheel 135, all rotate in the same direction. It is further a favourable feature that such direction or rotation is opposite to the direction of rotation of the primary shaft 2 and the secondary shaft 5.

In the following, the functioning of the transmission mechanism according to the invention is explained in more detail with reference to FIGS. 10–11.

Figure 10:
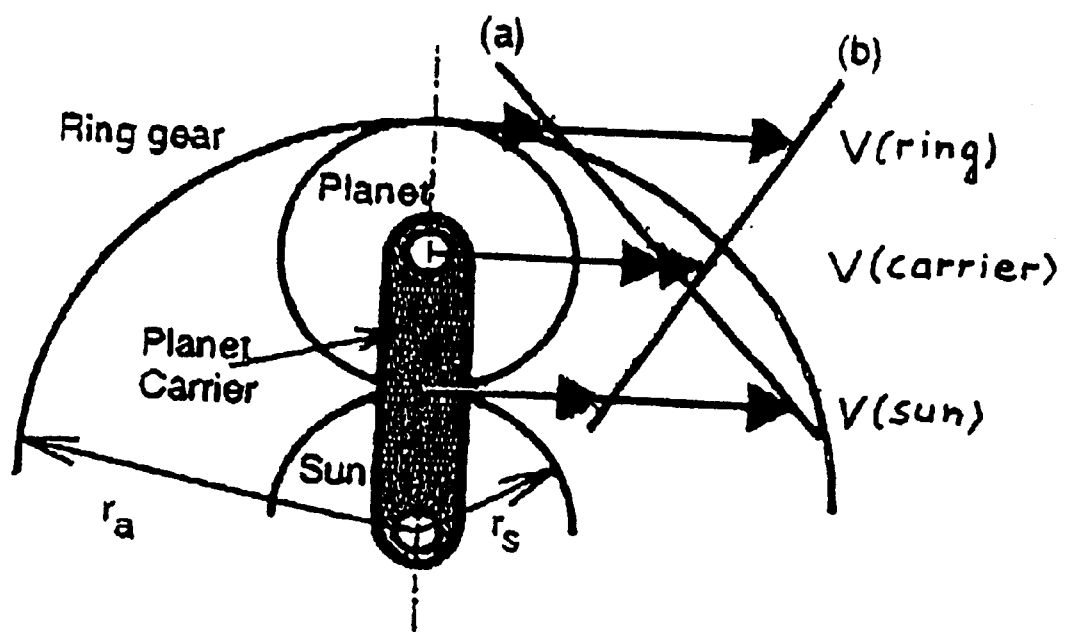
FIG. 10 schematically illustrates the kinematics of a planetary stage.

FIG. 10 schematically illustrates the kinematics of a planetary stage comprising a sun gear 132, a plurality of planetary pinions 125 carried by a common pinion carrier 121, and a ring gear 111. The respective circumferential speeds of these components are indicated by arrows V(sun), V(carrier), an V(ring), respectively, the lengths of said arrows corresponding to the amount of speed. In such a representation, the ends of such arrows are situated on a common straight line (a, b). This implies that if two gear speeds are known, the third speed is kinematically determined.

When used in a motor vehicle, the rotational speed of one of the components of the planetary stage is determined by the speed of the vehicle. The rotational speed of a second component is determined by the CVT ratio, which is controlled by control means on the basis of inter alia the position of the drive pedal, as mentioned above. Thus, the rotational speed of the third component coupled to the flywheel is controlled indirectly by controlling the CVT ratio.

In the preferred example as illustrated, the engine of the vehicle is coupled to the ring gear 111, the wheels of the vehicle are coupled to the pinion carrier 121, and the flywheel 135 is coupled to the sun gear 132. Suppose that, at a certain moment, the vehicle is cruising at constant speed in relatively high gear, i.e. with the rotational speed of the engine being relatively low. This situation is indicated by line (a). From FIG. 10, it can be seen that the rotational speed of the flywheel 135 is relatively higher in such situation, i.e. a large amount of energy is stored in the flywheel. Suppose that the driver now requests a quick acceleration, indicated by the driver quickly pressing the drive pedal down. Then, the control means for the CVT shifts the CVT towards a lower transmission ratio. This essentially corresponds to the normal CVT operation. As a result of this shifting to "lower gear", the rotational speed of the engine is increased, as mentioned earlier; this situation is indicated by line (b) in FIG. 10. It follows that the rotational speed is decreased, which means that at least part of the energy stored in the flywheel is delivered to the driveline, particularly to the engine. The vehicle inertia serves as a pivot for this power exchange because this inertia is much larger than the inertias of the engine and the flywheel.

If the auxiliary transmission assembly is properly dimensioned in terms of gear ratios and the flywheel inertia, and the CVT is properly controlled, the power supply of the flywheel can be manipulated such that, when the driver presses the drive pedal, the torque delivered to the wheels is increasing continuously, or at least does not show any dips, which means that the driver experiences an acceleration immediately when pressing the drive pedal, i.e. without any of the delays which he would experience with a light engine without the assistance of the auxiliary transmission according to the invention.

From the above it will be clear that energy transfer towards or from the flywheel can be controlled by the control means of the CVT by amending the transmission ratio of the CVT. When the CVT (or any other transmission T coupled to the epicyclic gearing G) is shifted down, e.g. in response of a driver's pressing the drive pedal, energy is delivered from the flywheel towards at least at the engine. When the driver removes his foot from the drive pedal because he wishes to slow down, normally the CVT shifted up, i.e. the rotational speed of the engine is decreased. As a consequence, the rotational speed of the flywheel is increases, and the energy necessary to do this is extracted from the drive system, which favourably means that an additional breaking force is exerted on the vehicle. The feeling of driveline breaking force can be smoothly controlled by adequate upshifting in combination with an electronic engine throttle control.

In the following, a model of a driveline comprising an engine E, a CVT, a planetary stage with a flywheel F, and wheels L is derived. Using this model, the relevant gear ratios and flywheel inertia can be chosen using a combined kinematic and dynamic optimisation procedure.

The power balance of the driveline with flywheel is given by:

$$\eta_{DL}\left[\left(T_e - J_e\frac{d\omega_e}{dt}\right)\omega_e - J_f\frac{d\omega_f}{dt}\omega_f\right] = \left(T_{RL} + J_v\frac{d\omega_v}{dt}\right)\omega_v \quad (1)$$

$$\omega_e = \frac{\omega_v}{i_f i_{CVT}} \quad (2)$$

$$\omega_f = \alpha_v\omega_v - \alpha_e\omega_e; \alpha_v = \frac{l+z}{i_c i_f}; \alpha_e = \frac{z}{i_a} \quad (3)$$

Herein:

$\eta_{DL}$ is the (non-constant) driveline efficiency;

$T_e$ is the torque delivered by the engine;

$J_e$ is the total inertia of the rotating parts at the engine side of the transmission (crankshaft, pistons, piston rods, camshaft, engine flywheel, launching device and primary CVT-pulley);

$\omega_e$ is the angular speed of the engine;

$J_f$ is the flywheel inertia;

$\omega_f$ is the angular speed of the flywheel;

$T_{RL}$ is the road load torque induced by tire-road friction, aerodynamical drag, hill climbing, etc.;

$J_v$ is the total inertia of the vehicle and the rotating parts seen at the driven wheels (secondary pulley, final drive assembly, drive shafts and wheels);

$\omega_v$ is the angular wheel speed.

Equation (1) essentially describes the balance between the net delivered power at the left-hand side and the demanded power at the right-hand side.

Equation (2) describes the kinematic relation between the engine and the vehicle speed. In this equation, $i_f$ is the fixed ratio of the final drive assembly, and $i_{CVT}$ is the (continuously) variable ratio of the of the CVT, defined as $\omega_{sec}/\omega_{prim}$, wherein $\omega_{sec}$ and $\omega_{prim}$ are the angular speed of the secondary and the primary pulley, respectively.

Equation (3) describes the kinematics of the planetary gearset. Herein:
- $z=r_a/r_s$ is the ratio of the ring gear and sun gear radius;
- $i_a$ is the gear ratio between the ring gear and the primary pulley;
- $i_c$ is the gear ratio between the carrier and the secondary pulley.

From equation (3) it is clear that if the engine speed is increased and unchanged vehicle speed, the flywheel speed will decrease, and vice versa, being exactly the desired mechanism. The kinematics and dynamics of the driveline are determined by the ratios $i_a$, $i_c$ and $z$ and the flywheel inertia $J_f$. The final reduction gear ratio $i_f$, the engine inertia $J_e$, and vehicle inertia $J_v$ are chosen identical to those for the vehicle equipped with a standard CVT driveline.

The relevant speeds in the driveline are $\omega_e$, $\omega_v$ and $\omega_f$. The relation between $\omega_e$ and $\omega_v$ is determined by the CVT ratio $i_{CVT}$ as described by equation (2). The relation between $\omega_f$ and the other two speeds is given by equation (3).

Relation (3) is determined if the coefficients $\alpha_e$ and $\alpha_v$ are known. It can be shown that the power losses within the flywheel unit strongly depend on the flywheel speed. Therefore, in an optimisation process to determine $\alpha_e$ and $\alpha_v$, the maximum flywheel speed (reached at the maximally achievable vehicle speed) serves as an optimisation parameter. A second speed constraint, which could fully determine the coefficients $\alpha_e$ and $\alpha_v$, can not be found straightforwardly. It appears that the CVT ratio coverage (total ratio control range of the CVT) in combination with said coefficients influences the effectiveness of the flywheel power delivery during power transients. This effectiveness, expressed in terms of subtracted energy vs. total flywheel energy contents before the transient, can be scaled with the flywheel inertia $J_f$. For this matter the power dynamics of the flywheel unit are of importance.

For simplicity it is assumed that $\eta_{DL}=1$. By differentiation of equation (3), substitution into (1), and use of relation (2), the following relation can be found:

$$\left(T_e - J_1 \frac{d\omega_e}{dt}\right)\omega_e = \left(T_{RL} - J_2 \frac{d\omega_v}{dt}\right)\omega_v \tag{4}$$

where $J_1$ and $J_2$ are defined by:

$$J_1(i_{CVT}) = J_e + [\alpha_e^2 - \alpha_e \alpha_v i_{CVT} i_f] J_f \tag{5}$$

$$J_2(i_{CVT}) = J_v + \left[\alpha_v^2 - \frac{\alpha_e \alpha_v}{i_{CVT} i_f}\right] J_f \tag{6}$$

Clearly, the qualitative value of the equivalent moments of inertia $J_1$ and $J_2$ can be controlled through the CVT-ratio $i_{CVT}$. Comparing the engine inertia $J_e$ and the equivalent inertia $J_1$, it appears that correctly choosing the design parameters $\alpha_e$, $\alpha_v$ and $J_f$, the engine inertia can be (more than) compensated within the CVT control range. This also has complications for the equivalent vehicle inertia $J_2$, which would become typically higher. Assuming perfect manipulability of the CVT ratio $i_{CVT}$, the new powertrain dynamics in (4) are incorporated in a procedure that finds the optimal design parameters $\alpha_e$, $\alpha_v$ and $J_f$.

The optimisation procedure aims at finding the optimal match in:
1) using the highest possible fraction of the total accumulated kinetic energy in the flywheel (equation (3));
2) minimal power losses in the flywheel unit by minimising the maximally achievable $\omega_f$ (equation (3));
3) and smoothening power assist dynamics over the full vehicle velocity range (equation (4)).

This optimal match is made under constructive design and fabrication constraints.

The outcome of this procedure resulted in a flywheel unit typically possessing automotive powertrain properties in terms of rotational speeds, inertia and size.

In the following, a sophisticated control strategy for achieving minimal fuel consumption at uncompromised drivability is described.

In a CVT-based (and also AT-based) vehicle, the speed control of the engine is taken away from the driver. An extensively tuned transmission control has to fill in the expectations of the average driver on this aspect of powertrain control. The only input left to determine the engine speed control is the position of the drive pedal. Conventionally, the drive pedal is in direct connection with the engine air input throttle, implying that the driver is able to control the engine output torque directly. It is, however, preferred to interpret the position of the drive pedal in terms of (longitudinal) vehicle control instead of engine control; in other words: to interpret the position of the drive pedal in terms of a desired power $P_d$ to be delivered to the wheels. This approach allows the driver to transparently control the vehicle speed, which is important for a safe driver-vehicle interaction. Therefore, in a preferred control device according to the present invention, the position of the drive pedal is used as input parameter for the control device, and the control device controls the CVT ratio as well as the engine throttle based on this input parameter (drive-by-wire).

Figure 11:
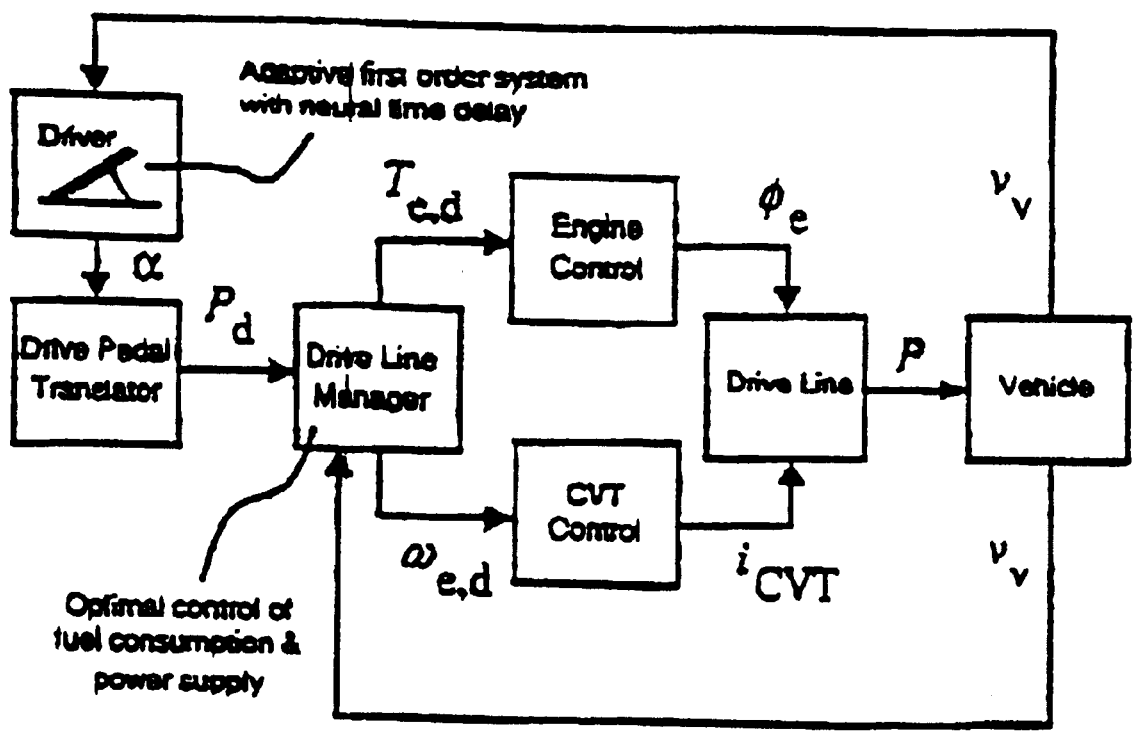
FIG. 11 shows a block diagram of a control system according to the invention.

FIG. 11 shows a block diagram of this control hierarchy.

The control device may calculate the desired power $P_d$ from the drive pedal position (angle of depression $\alpha$) based on, inter alia, the momentary position as well as the rate of change of the drive pedal, and the vehicle speed. More specifically, the control device may calculate the desired power $P_d$ from the drive pedal position (angle of depression $\alpha$) by means of a second order overdamped filter. The coefficients of this filter depend on the momentary position as well as the rate of change of the drive pedal, and the vehicle speed. The dependencies of the filter coefficients to these variables can be found by investigating the bandwidth of the (flywheel assisted) driveline and by heuristics on drivers' expectations of vehicle response. The quality of these coefficients has to be validated in real life experiments.

From the available reference signal $P_d$, the control device computes the setpoints $T_{e,d}$ for the engine torque and the engine speed $\omega_{e,d}$. The setpoint $T_{e,d}$ is found by obtaining the corresponding engine torque on the so-called "E-line" for the desired wheel power $P_d$. (The E-line for an engine or a type of engine is the collection of operating points where engine output power can be delivered at minimal specific fuel consumption. The E-line is drawn in the so-called "engine map", wherein, in a graph similar to FIG. 4, lines of constant Brake Specific Fuel Consumption (BSFC, in g/kWh) are drawn as a function of angular engine speed $\omega_e$ and induced engine output torque $T_e$.) The setpoint $\omega_{e,d}$ is computed by equating the desired wheel power $P_d$ to the power in the driveline, i.e.

$$\left(T_{e,d} - J_1 \frac{d\omega_{e,d}}{dt}\right)\omega_{e,d} - J_2^* \frac{d\omega_v}{dt}\omega_v = P_d \tag{7}$$

$$J^*_2 = J_2 - J_v \tag{8}$$

These are the setpoints for the local engine control and CVT control systems that realise an engine input air throttle angle $\phi_e$ and a CVT ratio $i_{CVT}$, respectively. The driveline transmits the emanating power P to the vehicle resulting in a vehicle speed $v_v$. The current vehicle speed is measured and fed back to the drive line control device for computing the optimal engine speed according to equation (7).

When the transmission system according to the invention is combined with a specific engine, the combined inertias of all rotational members (engine, pulleys, epicyclic gearing, flywheel) add up to an effective inertia $J_{eff}$ as seen at the engine. This effective inertia $J_{eff}$ depends on the transmission ratio $I_{CVT}$ of the main transmission 30. For a certain value of $i_{CVT}$ the effective inertia $J_{eff}$ equals zero: this transmission state is indicated as "zero inertia", and the corresponding value of $i_{CVT}$ is indicated as $i_{CVT,ZI}$, and is preferably approximately equal to 1.

For another certain value of $i_{CVT}$, the effective inertia $J_{eff}$ is almost equal to the inertia $J_e$ of the engine, due to the fact that the rotational speed of the flywheel is zero at this transmission ratio: this transmission state is indicated as "geared neutral", and the corresponding value of $i_{CVT}$ is indicated as $i_{CVT,gn}$. Preferably, $i_{CVT,gn}$ is between 0.4 and 0.8, more preferably between 0.4 and 0.6.

In the following, the typical difference between the control method according to the invention and the control method of a conventional CVT-transmission will be illustrated by way of example with reference to FIG. 12. It appears that the dynamic influence of inertia is enormous.

Figure 12:
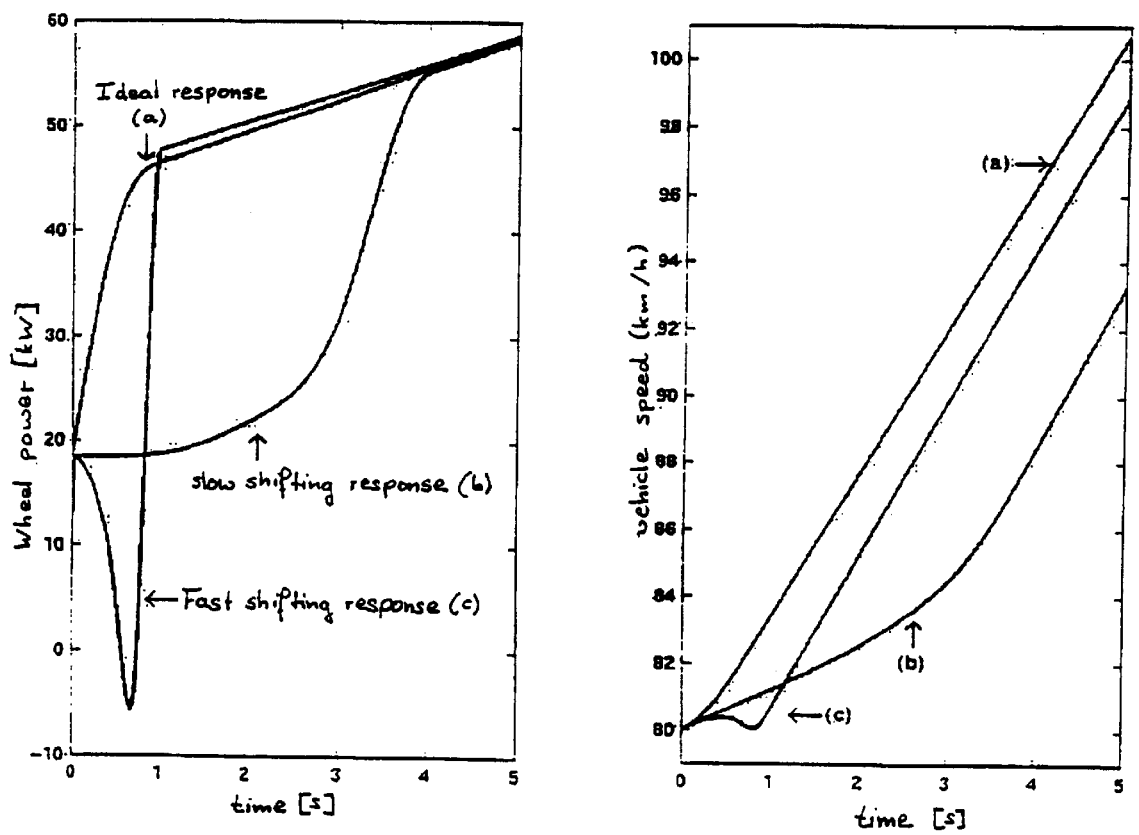
FIG. 12 shows two plots illustrating the effect of the invention.

FIG. 12 shows two plots; in the left-hand plot, three net power transitions at the wheels as a function of time are portrayed. The right hand plot shows, for the same transitions, the vehicle speed as a function of time. Due to the strong influence of $J_e$ in combination with the low torque reserve, the response of the vehicle is either non-minimum phase for fast downshifting (c) of the transmission ratio or shows latency for slow downshifting (b). The non-minimum phase behaviour is introduced by kinetic energy of the vehicle inertia $J_v$ automatically flowing to the accelerating engine inertia $J_e$. The latency in the power transition at the wheels is introduced by the engine first using its small amount of torque potential to accelerate itself before (promptly) accelerating the vehicle. From observation of these extreme cases it is clear that the conventional shifting control strategies do not even come close to the vehicle response (a) according to the invention.

It should be evident to a person skilled in the art that the scope of the present invention is not limited to the examples discussed above, but that several amendments and modifications will be possible without departing from the scope of the invention as defined in the appending claims.

As an example, it is possible to couple the primary shaft and the ring carrier of the planetary system by means of a chain instead of a toothed gearing. In such a case, the ring carrier is not submitted to axial force components due to a helical shape of the teeth, therefore the axial size of the ring carrier can be shorter and the ring need only be supported by one bearing. A similar remark can be made with reference to the coupling between the secondary shaft and the pinion carrier of the planetary system. A further advantage of using chains instead of toothed couplings is that the spatial position of the axes of the primary shaft, the secondary shaft and the planetary system can be chosen independently of the transfer ratio between said couplings and independently of the diameters of said members.

Further, in principle the spatial position of the auxiliary transmission 50 can be chosen mirror-symmetrical with respect to a plane defined by the axes of the primary and secondary shafts. However, preferably the auxiliary transmission 50 is positioned above such plane, as illustrated in FIGS. 8A and 9, because on the opposite side there is a shaft 7 coupling the output of the transmission system to the wheels of the vehicle.

Further it should be clear that any method and device which are directly and unambiguously clear for a person skilled in the art after reading the description and studying the drawings are intended to fall under the scope of the inventive concept.

Summarizing, the present invention relates to the following aspects:

$1^{st}$ Aspect

Drive assembly for use in a motorised vehicle, comprising:

an epicyclic gearing G having three rotational members 41, 42, 43;

a first inertia component E coupled to a first rotational member 41 of said epicyclic gearing G;

a second inertia component L coupled to a second rotational member 42 of said epicyclic gearing G;

a third inertia component F coupled to a third rotational member 43 of said epicyclic gearing G;

and a transmission unit MT coupled with two of said rotational members 41, 42 of said epicyclic gearing G;

wherein at least one of said inertia components E comprises a drive energy source such as a combustion engine or electric motor;

wherein at least one of said inertia components L comprises said motorised vehicle;

and wherein at least one of said inertia components F comprises an energy accumulator, preferably a kinematic accumulator such as a flywheel.

$2^{nd}$ Aspect

Drive assembly according to the $1^{st}$ aspect, wherein the epicyclic gearing G comprises a planetary stage, comprising a ring gear 111, a plurality of planetary pinions 125 mounted on a planet carrier 121, and a sun gear 132, wherein the sun gear 132 is operatively coupled to said flywheel F.

$3^{rd}$ Aspect

Drive assembly according to the $2^{nd}$ aspect, wherein said ring gear 111 is operatively coupled to said drive energy source E and wherein said planetary pinion carrier 121 is operatively coupled to said vehicle load L.

$4^{th}$ Aspect

Drive assembly according to the $2^{nd}$ aspect or the $3^{rd}$ aspect, wherein said sun gear 132 and said flywheel F are mounted on a common shaft 131.

$5^{th}$ Aspect

Drive assembly according to the $4^{th}$ aspect, wherein said sun gear 132 and said shaft 131 are integrally formed as a unit.

$6^{th}$ Aspect

Drive assembly according to any of the above-described aspects, wherein the drive energy source E is a high speed, relatively light combustion engine.

$7^{th}$ Aspect

Drive assembly according to the $6^{th}$ aspect, wherein said engine under normal driving conditions operates near momentary maximum torque.

$8^{th}$ Aspect

Motorised vehicle V comprising a drive assembly according to any of the above-described aspects.

$9^{th}$ Aspect

Auxiliary transmission unit 50 for use in a motorised vehicle, comprising:

an epicyclic gearing having three rotational members 110, 120, 130, of which a first rotational member 110 is operatively connectable to a rotational input 140, and a second rotational member 120 is operatively connectable to a rotational output 150;

a flywheel 135 operatively coupled to a third of said rotational members 130; and interconnecting means 51, 54, 55, 59, 131 for interconnecting said flywheel 135 and said epicyclic gearing to define a unit which may be modularly added to a main transmission 30.

10$^{th}$ Aspect

Auxiliary transmission system according to the 9$^{th}$ aspect, wherein said epicyclic gearing comprises a planetary stage, wherein a first 110 of said rotational members comprises a ring gear 111 of said planetary stage, wherein the second 120 of said rotational members comprises a pinion carrier carrying the planetary pinions 125 of said planetary stage, and wherein the third rotational member 130 comprises the sun gear 132 of said planetary stage.

11$^{th}$ Aspect

Auxiliary transmission system according to the 9$^{th}$ aspect or the 10$^{th}$ aspect, wherein the third rotational member 130 comprises a central shaft 131, and wherein both the sun gear 132 and the flywheel 135 are mounted on said central shaft 131.

12$^{th}$ Aspect

Auxiliary transmission according to any of the 9$^{th}$ to the 11$^{th}$ aspect, wherein the second rotational member 120 comprises a substantially cylindrical support part 121 extending around a part of the length of the central shaft 131 of the third rotational member 130, and wherein the first rotational member 110 comprises a cylindrical portion 114 extending around a part of the length of said cylindrical support part 121 of said second rotational member 120;

wherein said auxiliary transmission unit 50 comprises a housing 51, 52 rotatably supporting the central shaft 131 of said third rotational member 130 by bearing means 81, 82;

wherein said housing 51, 52 rotatably supports said cylindrical support part 121 of said second rotational member 120 by bearing means 83, 84;

and wherein said cylindrical portion of said first rotational member 110 is rotatably supported by said cylindrical support part 121 of said second rotational member 120 by bearing means 86, 87.

13$^{th}$ Aspect

Auxiliary transmission unit according to the 12$^{th}$ aspect, wherein said housing 51 comprises a chamber 53 for accommodating the flywheel 135, the chamber 53 having a side wall 54, wherein a substantially cylindrical safety ring 57 is arranged adjacent to the side wall 54, the safety ring 57 surrounding said flywheel over at least substantially its width.

14$^{th}$ Aspect

Auxiliary transmission unit according to the 12$^{th}$ aspect or the 13$^{th}$ aspect, wherein said housing 51 comprises a chamber 53, the housing 51, 52 further comprising closing means 55 for closing the chamber 53, the closing means 55 being provided with a cap 59 which carries at least a second 82 of said bearing means for said central shaft 131.

15$^{th}$ Aspect

Auxiliary transmission unit according to the 14$^{th}$ aspect, wherein the bearing means 81, 82 for said central shaft 131 define a line of action making an angle less than 90° with the central axis of said central shaft 131.

16$^{th}$ Aspect

Auxiliary transmission unit according to the 15$^{th}$ aspect, wherein said line of action of the second bearing 82 intersects said central axis of the central shaft 131 at a point substantially coinciding with a central plane of said closing means 55.

17$^{th}$ Aspect

Auxiliary transmission unit according to any of the 14$^{th}$ to the 16$^{th}$ aspect, wherein the axial stiffness of the second bearing 82 mounted in said closing means 55 is considerably less than the axial stiffness of the first bearing 81 mounted in the housing 52.

18$^{th}$ Aspect

Auxiliary transmission unit according to any of the 14$^{th}$ to the 17$^{th}$ aspect, wherein said closing means 55 is formed substantially as a plate, the plate preferably showing characteristics of a membrane.

19$^{th}$ Aspect

Auxiliary transmission unit according to the 14$^{th}$ aspect or the 15$^{th}$ aspect, wherein both bearing means 81, 82 are mounted in the cap 59.

20$^{th}$ Aspect

Auxiliary transmission unit according to the 19$^{th}$ aspect, wherein the cap 59 comprises two cap-halves 59', 59", which are screwed together, and which clamp between them said two bearing means 81, 82 as well as the plate 55.

21$^{st}$ Aspect

Auxiliary transmission unit according to the 19$^{th}$ aspect or the 20$^{th}$ aspect, wherein the central shaft 131 is hollow, wherein a support pin 61 extends through the length of the hollow central shaft and is fastened with one end to the housing and with its opposite end to the cap 59, such that said support pin provides the axial stiffness for the bearing of the central shaft whereas the radial stiffness is provided by the plate.

22$^{nd}$ Aspect

Auxiliary transmission unit according to the 21$^{st}$ aspect, wherein an axial channel 62 extends through the support pin 61, from said end fastened to said housing to a branch portion opening into the side wall of the support pin 61 and communicating with a boring in the central shaft 131, at or near the position of the sun gear 132.

23$^{rd}$ Aspect

Auxiliary transmission unit according to any of the 11$^{th}$ to the 22$^{nd}$ aspect, wherein the central shaft 131 comprises a flange 133 for mounting the flywheel 135, and wherein the housing 51 comprises a safety ring 60 extending around said flange 133, preferably with some play.

24$^{th}$ Aspect

Auxiliary transmission unit according to any of the 9$^{th}$ to the 23$^{rd}$ aspect, wherein the first rotational member 110 and the second rotational member 120 are provided with external toothing.

25$^{th}$ Aspect

Auxiliary transmission unit according to the 24$^{th}$ aspect, wherein the first rotational member 110 comprises a substantially disc shaped ring carrier 112 being axially spaced with respect to the ring gear 111, and wherein said external toothing of the first rotational member 110 is provided on the circumferential edge of said ring carrier 112.

26$^{th}$ Aspect

Auxiliary transmission unit according to the 25$^{th}$ aspect, wherein the ring gear 111 is axially and tangentially fixed to said ring carrier 112 but has at least some radial freedom with respect to said ring carrier 112.

27$^{th}$ Aspect

Auxiliary transmission unit according to any of the 24$^{th}$ to the 26$^{th}$ aspect, wherein the second rotational member 120 comprises a pan shaped member comprising a substantially radially extending bottom and a substantially axially extending side wall, said side wall being arranged adjacent and around said ring gear 111 of the first rotational member 110, and wherein said external toothing of the second rotational member 120 is provided externally on said side wall of said pan shaped member.

28$^{th}$ Aspect

Auxiliary transmission unit according to the 27$^{th}$ aspect, wherein said bottom of said pan shaped member is arranged between said planetary pinions 125 and said flywheel 135;

wherein said ring carrier 112 is arranged on the opposite side of said planetary pinions 125;

wherein said cylindrical portion 114 of said first rotational member 110 extends, with respect to said ring carrier 112, away from said planetary pinions 125.

29$^{th}$ Aspect

Auxiliary transmission unit according to any of the above-described aspects, further comprising a primary coupling gear 140 rotatably supported in the housing 51 by bearing means 88, and a secondary coupling gear 150 rotatably supported by the housing 51 by bearing means 89, the primary coupling gear 140 being in meshed contact with the external toothing of the first rotational member 110, and the secondary coupling gear 150 being in meshed contact with the external toothing of the second rotational member 120, wherein the rotational axis of the primary coupling gear 140 is parallel to the rotational axis of the secondary coupling gear 150.

30$^{th}$ Aspect

Auxiliary transmission unit according to the 29$^{th}$ aspect, wherein the primary coupling gear 140 and the secondary coupling gear 150 comprise coupling means for coaxially coupling the primary coupling gear 140 and the secondary coupling gear 150, respectively, to a primary shaft 2 and a secondary shaft 5, respectively, said coupling means preferably comprising key ways.

31$^{st}$ Aspect

Transmission system 40, comprising a main transmission unit 30 and an auxiliary transmission unit 50 according to any of the 9$^{th}$ to the 25$^{th}$ aspect;

wherein the main transmission 30 comprises a primary shaft 2 for coupling with a drive energy source such as a combustion engine, and a secondary shaft 5 for coupling with a driven load L such as the wheels of a motorised vehicle;

wherein the primary shaft 2 of the main transmission unit 30 is coupled with a first rotational member 110 of the auxiliary transmission unit 50, and wherein the secondary shaft 5 of the main transmission unit 30 is coupled with a second rotational member 120 of the auxiliary transmission unit 50;

wherein the auxiliary transmission unit comprises an epicyclic gearing with three rotational members, a first of said rotational members being operatively connected to said primary shaft 2, a second of said rotational members being operatively connected to said secondary shaft 5, and a third of said rotational members being operatively connected to a third inertia component.

32$^{nd}$ Aspect

Transmission system according to the 31$^{st}$ aspect, wherein said primary shaft 2 and said secondary shaft 5 extend parallel to each other, each having a free end directed towards said auxiliary transmission unit 50, and wherein a central shaft 131 of the third rotational member 130 of the auxiliary transmission unit 50 extends parallel to said primary shaft 2 and said secondary shaft 5 of the main transmission unit 30.

33$^{rd}$ Aspect

Transmission system according to the 32$^{nd}$ aspect, wherein the length of the central shaft 131 of the third rotational member 130 of the auxiliary transmission unit 50 has an overlap with the length of the primary shaft 2 and the secondary shaft 5 of the main transmission unit 30, preferably said overlap being in the order of about 15 cm.

34$^{th}$ Aspect

Transmission system according to the 33$^{th}$ aspect, wherein said main transmission unit 30 comprises a CVT.

35$^{th}$ Aspect

35. Transmission system according to any of the 31$^{th}$ to the 34$^{th}$ aspect, wherein housing 51, 52 of the auxiliary transmission unit 50 is provided with bearing means for the primary shaft 2 and the secondary shaft 5 of the main transmission unit 30.

36$^{th}$ Aspect

Transmission system 40 according to any of the above-described aspects, wherein said auxiliary transmission unit 50 is accommodated in a housing part of said system 40, preferably a lid-like housing part, the housing part preferably carrying bearing means for driving shafts of said main transmission unit 30 and preferably being exchangeable with an axially smaller lid-like housing part, realising a set of housing parts for modularly producing transmission systems with and without said auxiliary transmission unit 50 in combination with a main housing part.

37$^{th}$ Aspect

Motorised vehicle, comprising a transmission system 40 according to any of the 31$^{st}$ to the 36$^{th}$ aspect, with a main transmission unit 30 and an auxiliary transmission unit 50;

wherein the primary shaft 2 of the main transmission unit 30 is coupled to a drive energy source such as a combustion engine of said vehicle, and wherein the secondary shaft 5 of the main transmission unit 30 is coupled to wheels of said vehicle;

wherein the auxiliary transmission unit comprises an epicyclic gearing with three rotational members, a first of said rotational members being operatively connected to said primary shaft 2, a second of said rotational members being operatively connected to said secondary shaft 5, and a third of said rotational members being operatively connected to a third inertia component such as a flywheel 135;

and wherein the kinematic component may simultaneously be operatively connected to both of the vehicle engine and the secondary shaft 5 while unloading its kinetic energy.

38$^{th}$ Aspect

First rotational member 110 for use in an auxiliary transmission unit 50, comprising a ring gear 111 provided with internal toothing for use in a planetary stage, and further provided with external toothing.

39$^{th}$ Aspect

First rotational member according to the 38$^{th}$ aspect, comprising a substantially disc shaped ring carrier 112 coupled to said ring gear 111, the ring carrier 112 being axially spaced with respect to said ring gear 111, said outer toothing being provided on a circumferential edge of said ring carrier 112, the ring carrier 112 preferably having a larger outer diameter than said ring gear 111.

40$^{th}$ Aspect

40. First rotational member 110 according to the 38$^{th}$ aspect or the 39$^{th}$ aspect, further comprising a substantially cylindrical portion 114 being coupled to said ring carrier 112, and preferably being integrally formed with said ring carrier 112, facing away from said ring gear 111, said cylindrical portion being shaped for receiving bearings means 86, 87.

41st Aspect

Second rotational member 120 for an auxiliary transmission unit 50, comprising:
 a substantially cylindrical support part 121;
 a first flange 122 extending substantially radially with respect to the support part 121;
 a second flange 123 extending substantially radially with respect to the support part 121;
 a plurality of planetary pinions 125 being rotatably supported with respect to said first and second flanges 122, 123;
 said second rotational member 120 further being provided with external toothing.

42nd Aspect

Second rotational member according to the 41st aspect, wherein said external toothing is provided on a circumferential edge of said first flange 122.

43rd Aspect

Second rotational member according to the 42nd aspect, wherein the first flange 122 has a substantially pan-like shape, comprising a substantially axially extending portion surrounding said plurality of pinions 125, wherein said external toothing is provided at the free edge of said cylindrical portion.

44th Aspect

Third rotational member 130 for an auxiliary transmission unit 50, comprising a central shaft 131 carrying a sun gear 132 and a flywheel 135, said central shaft 131 preferably being hollow.

45th Aspect

Third rotational member according to the 44th aspect, wherein said sun gear 132 and said shaft 131 are integrally formed as a unit.

46th Aspect

Planetary stage 50, comprising:
 a sun gear 132 mounted on a central shaft 131;
 a plurality of planetary pinions in meshed contact with said sun gear 132, said planetary pinions being mounted on a planet carrier 121, 122 being provided with external toothing, said external toothing being axially displaced with respect to the axial position of said sun gear;
 a ring gear 111 being in meshed contact with said planetary pinions, said ring gear 111 being mounted on a ring carrier 112 which is provided with external toothing, said external toothing being axially displaced with respect to the axial position of the sun gear 132 and with respect to the axial position of the external toothing of the planet carrier.

47th Aspect

Use of a flywheel as an energy accumulator in an epicyclic gearing coupled in parallel to a main transmission 30, the main transmission 30 preferably being a CVT.

48th Aspect

Flywheel 135 for assisting an engine in a motorised vehicle, having a diameter in the order of 40 cm or less, preferably about 35 cm; having a width (axial length) in the order of 5 cm or less, preferably about 4 cm; having a total weight in the order of 20 kg or less; and having a kinetic energy in the order of about 140–150 kJ when rotating at about 8000–9000 rpm.

49th Aspect

Flywheel according to the 48th aspect, comprising a central portion with an axial dimension in the order of about 1 cm, preferably provided with openings for weight reductions; further comprising a peripheral portion with an axial dimension in the order of about 4 cm, wherein the inner diameter of the peripheral portion is about 0.7–0.8 times the outer diameter thereof; the flywheel preferably comprising an intermediate portion with inclined thickness matching the thick peripheral portion with the thin central portion to avoid steep and discontinuous transitions in thickness.

50th Aspect

Motorised vehicle V, comprising an engine E and a main transmission MT coupling the engine to wheels L of the vehicle, the main transmission preferably being a CVT; the vehicle further comprising a flywheel F as an energy accumulator in an epicyclic gearing G coupled in parallel to said main transmission MT; the flywheel preferably being configured in accordance with the 48th aspect or the 49th aspect; wherein, when the engine is operated at its maximum rotational speed under normal driving conditions, the rotational speed of the flywheel is preferably in the range of 8000–9000 rpm, more preferably approximately equal to about 8000 rpm.

51st Aspect

Method of increasing motor speed in a motorised vehicle when acceleration is required, comprising the steps of:
 coupling a flywheel with said motor such that kinetic energy is stored in said flywheel during normal driving conditions;
 and, when acceleration is required, coupling said flywheel with said motor such that kinetic energy from said flywheel is transferred to said motor.

52nd Aspect

Method according to the 51st aspect, comprising the steps of:
 coupling an output shaft of said engine to a primary rotational member 31 of a main transmission 30 and to a primary rotational member 110 of an epicyclic gearing;
 coupling the driven wheels of said vehicle to a secondary rotational member 32 of said main transmission 30 and to a secondary rotational member 120 of said epicyclic gearing;
 coupling said flywheel to a third rotational member 130 of said epicyclic gearing;
 under normal driving conditions, controlling the main transmission 30 to have a predetermined transmission ratio for optimum driving efficiency;
 and, when acceleration is required, changing the transmission ratio of the main transmission 30 such that the rotational speed of the first rotational member of the epicyclic gearing is increased.

53rd Aspect

Control system method for controlling the drive line of a vehicle comprising a transmission system 40 as described in any of the preceding aspects, wherein at least during dynamic operating conditions the vehicle speed response to the driver's speed signal as may be provided through impression of a so-called drive-pedal or, alternatively denoted, gas-pedal is virtually direct, in particular such that the internal dynamics of the drive line are virtually absent, at least neutralized in view of driver-sensation.

54th Aspect

Control method, in particular according to the 53rd aspect, wherein the driver's speed signal is interpreted as a desired power $P_d$ to be delivered to the vehicle wheels L.

55th Aspect

Control method according to the 53rd aspect or the 54th aspect, wherein the power $P_d$ desired at the wheels is realised by the application of a pre-compensating factor for at least the engine inertia $J_e$, preferably also by the application of a vehicle pre-compensating factor $J_v$.

56th Aspect

Control method according to any of the 53rd to the 55th aspect, wherein the desired and noticeable vehicle response to the drivers signal is less than one second, in particular less than half a second.

57th Aspect

Control method, in particular according to any of the 53rd to the 56th aspect, wherein from an available reference signal $P_d$ a setpoint $T_{e,d}$ for the engine torque and a setpoint for the engine speed $W_{e,d}$ are computed, the setpoint for engine torque preferably being determined by the engine torque corresponding to the desired wheel power $P_d$ on the so-called E-line within the BSFC (constant Brake specific fuel consumption) engine map of the relevant vehicle engine.

58th Aspect

Control method according to the 57th aspect, wherein the setpoint for the engine speed $W_{e,d}$ is computed by equating the desired wheel power $P_d$ to the power in the drive line, in particular according to the following equation:

$$\left(T_{e,d} - J_1 \frac{d\omega_{e,d}}{dt}\right)\omega_{e,d} - (J_2 - J_v)\frac{d\omega_v}{dt}\omega_v = P_d$$

59th Aspect

59. Control method, in particular according to any of the 53rd to the 58th aspect, wherein the generation of the reference input $P_d$ for the desired wheel power out of the driver's speed signal, in particular out of the impression of the drive pedal, is realised by the application of a second order overdamped filter.

60th Aspect

Transmission system 40 wherein the geared neutral ratio $i_{cvt,gn}$ is between 0.4 and 0.8, preferably between 0.4 and 0.6.

61st Aspect

Transmission system 40 for use in a motorized vehicle, comprising:
  a main transmission unit 30 which comprises:
  a primary shaft 2 for coupling with a drive energy source such as a combustion engine; and
  a secondary shaft 5 for coupling with a driven load L such as the wheels of a motorized vehicle;
  an auxiliary transmission unit 50 which comprises:
  an epicyclic gearing having three rotational members 110, 120, 130; and
  a flywheel 135 operatively coupled to a third of said rotational members 130;
  wherein the primary shaft 2 of the main transmission unit 30 is coupled with a first rotational member 110 of the auxiliary transmission unit 50,
  wherein the secondary shaft 5 of the main transmission unit 30 is coupled with a second rotational member 120 of the auxiliary transmission unit 50;
  wherein said primary shaft 2 and said secondary shaft 5 extend parallel to each other, each having a free end directed towards said auxiliary transmission unit 50;
  wherein a central shaft 131 of the third rotational member 130 of the auxiliary transmission unit 50 extends parallel to said primary shaft 2 and said secondary shaft 5 of the main transmission unit 30;
  and wherein the length of the central shaft 131 of the third rotational member 130 of the auxiliary transmission unit 50 has an overlap with the length of the primary shaft 2 and the secondary shaft 5 of the main transmission unit 30, said overlap preferably being in the order of about 15 cm.

What is claimed is:

1. Auxiliary transmission unit for use in a motorized vehicle having a main transmission with a primary shaft and a secondary shaft, the unit comprising an epicyclic gearing having three rotational members and a flywheel, wherein both a first and a second rotational member of the auxiliary transmission unit may be coupled to either one of the primary shaft or the secondary shaft of the main transmission and a third rotational member mounted on a central shaft is operatively coupled to the said flywheel;
  wherein the said first and the said second rotational members are provided with interconnecting means for operatively coupling said members to either one of a primary shaft and a secondary shaft, which interconnecting means comprise a primary coupling gear being in meshed contract with the first rotational member and a secondary coupling gear being in meshed contact with the second rotational member.

2. Auxiliary transmission unit according to claim 1, wherein the flywheel is mounted on the central shaft.

3. Auxiliary transmission unit according to claim 1, wherein said epicyclic gearing comprises a planetary stage, wherein the first rotational member comprises a ring gear of said planetary stage, wherein the second rotational members comprises a planetary pinion carrier of said planetary stage, and wherein the third rotational member comprises the sun gear of said planetary stage.

4. Auxiliary transmission unit according to claim 1, wherein the second rotational member comprises a substantially cylindrical support part extending around a part of the length of the central shaft of the third rotational member, and wherein the first rotational member comprises a cylindrical portion extending around a part of the length of said cylindrical support part of said second rotational member.

5. Auxiliary transmission unit according to claim 1, the unit further comprising a housing, wherein said housing is provided with at least two bearing means for rotatably accommodating the primary shaft and the secondary shaft of the main transmission unit.

6. Auxiliary transmission unit according to claim 1, adapted to receive free ends of mutually parallel extending primary and secondary shafts of the main transmission, wherein the central shaft of the third rotational member is oriented parallel to said mutually parallel extending primary and secondary shafts of the main transmission unit.

7. Auxiliary transmission unit according to claim 1, wherein a housing of the unit is adapted to serve as a housing part of a main transmission.

8. Auxiliary transmission unit according to claim 1, wherein said primary and secondary coupling gear comprise key ways for coaxially coupling to either one of a primary shaft and a secondary shaft.

9. Auxiliary transmission unit according to claim 2, wherein said flywheel is an integral part of the central shaft.

10. Auxiliary transmission unit according to claim 3, wherein said planetary stage further comprises:
  a plurality of planetary pinions being in meshed contact with the sun gear and that are mounted on the planetary pinion carrier, which is provided with external toothing; and
  a ring carrier formed integrally with the ring gear being in meshed contact with the planetary pinions, which ring carrier is provided with external toothing that is axially displaced with respect to an axial position of the external toothing of the planetary pinion carrier.

11. Auxiliary transmission unit according to claim 10, wherein the ring gear of the ring carrier is axially and tangentially fixed with respect to other parts of the said ring carrier, but has some radial freedom of movement with respect to the same.

12. Auxiliary transmission unit according to claim 4, the unit further comprising a housing, wherein said housing rotatably supports the central shaft of said third rotational member by first bearing means, wherein said housing rotatably supports said cylindrical support part of said second rotational member by second bearing means, and wherein said cylindrical portion of said first rotational member is rotatably supported by said cylindrical support part of said second rotational member by third bearing means.

13. Auxiliary transmission unit according to claim 12, wherein said housing further comprises a chamber and closing means for closing the chamber, the closing means comprising a cap centrally mounted on a plate, which cap carries at least one bearing of said first bearing means for said central shaft.

14. Auxiliary transmission unit according to claim 12, wherein the central shaft is hollow and wherein a support pin extends through a length of the hollow central shaft, the support pin being fastened with one end to the housing and with its opposite end to the cap.

15. Auxiliary transmission unit according to claim 13, wherein the plate is mounted in a prestressed condition exerting an axial force on the central shaft.

16. Auxiliary transmission unit according to claim 6, wherein said central shaft lengthwise overlaps with the primary shaft and the secondary of the main transmission unit when these are received by the auxiliary transmission unit.

17. Auxiliary transmission unit according to claim 7, wherein said housing comprises bearing means for rotatably accommodating the primary shaft and the secondary shaft of the main transmission unit.

18. Auxiliary transmission unit according to claim 7, wherein said housing being exchangeable with a standard housing part of the main transmission, thereby realizing a set of interchangeable housing parts for the main transmission.

19. Auxiliary transmission unit for use in a motorized vehicle having a main transmission with a primary shaft and a secondary shaft, the unit comprising an epicyclic gearing having three rotational members and a flywheel, wherein both a first and a second rotational member of the auxiliary transmission unit may be coupled to either one of the primary shaft or the secondary shaft of the main transmission and a third rotational member mounted on a central shaft is operatively coupled to the said flywheel;

wherein said epicyclic gearing comprises a planetary stage, wherein the first rotational member comprises a ring gear of said planetary stage, wherein the second rotational members comprises a planetary pinion carrier of said planetary stage, and wherein the third rotational member comprises a sun gear of said planetary stage; and wherein said planetary stage further comprises:
a plurality of planetary pinions being meshed contact with the sun gear and that are mounted on the planetary pinion carrier, which is provided with external toothing; and
a ring carrier formed integrally with the ring gear being in meshed contact with the planetary pinions, which ring carrier is provided with external toothing that is axially displaced with respect to an axial position of the external toothing of the planetary pinion carrier.

20. Auxiliary transmission unit for use in a motorized vehicle having a main transmission with a primary shaft and a secondary shaft, the unit comprising an epicyclic gearing having three rotational members and a flywheel, wherein both a first and a second rotational member of the auxiliary transmission unit may be coupled to either one of the primary shaft or the secondary shaft of the main transmission and a third rotational member mounted on a central shaft is operatively coupled to the said flywheel;

wherein the second rotational member comprises a substantially cylindrical support part extending around a part of the length of the central shaft of the third rotational member, and wherein the first rotational member comprises a cylindrical portion extending around a part of the length of said cylindrical support part of said second rotational member.

* * * * *